United States Patent
Wright et al.

(10) Patent No.: US 11,388,460 B2
(45) Date of Patent: *Jul. 12, 2022

(54) PORTABLE MULTI-PURPOSE AUDIENCE MEASUREMENT SYSTEMS, APPARATUS AND METHODS

(71) Applicant: The Nielsen Company (US), LLC, New York, NY (US)

(72) Inventors: David Howell Wright, Safety Harbor, FL (US); Arun Ramaswamy, Tampa, FL (US); Dan Nelson, Tampa, FL (US); Glen Vilches, Dunedin, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/101,828

(22) Filed: Nov. 23, 2020

(65) Prior Publication Data

US 2021/0152862 A1    May 20, 2021

Related U.S. Application Data

(60) Continuation of application No. 16/140,231, filed on Sep. 24, 2018, now Pat. No. 10,848,804, which is a
(Continued)

(51) Int. Cl.
*H04N 21/24* (2011.01)
*G06Q 30/02* (2012.01)
(Continued)

(52) U.S. Cl.
CPC ......... *H04N 21/2407* (2013.01); *G06Q 30/02* (2013.01); *H04H 60/31* (2013.01);
(Continued)

(58) Field of Classification Search
CPC ......... H04N 21/2407; H04N 21/25883; H04N 21/41407; H04N 21/4394; H04N 21/44204; H04N 21/44222
See application file for complete search history.

(56) References Cited

U.S. PATENT DOCUMENTS 4,704,696 A    11/1987  Reimer et al.
4,858,000 A    8/1989   Lu
(Continued)

FOREIGN PATENT DOCUMENTS

CN    1283341    2/2001
CN    1336084    2/2002
(Continued)

OTHER PUBLICATIONS

United States Patent and Trademark Office, "Office Action," mailed in connection with corresponding U.S. Appl. No. 12/540,154, dated Mar. 15, 2011, (8 pages).
(Continued)

*Primary Examiner* — Joshua D Taylor
(74) *Attorney, Agent, or Firm* — Hanley, Flight & Zimmerman, LLC

(57) ABSTRACT

An example apparatus disclosed herein includes means for collecting demographic data of a user, including a phone number for a mobile device, via a website associated with an information gathering entity, the demographic data collected via the website from a personal computer, separate from the mobile device, used to access the website. The disclosed example apparatus also includes means for sending a message to the mobile device, the sent message, when responded to, resulting in downloading of a metering software module to the mobile device. The disclosed example apparatus further includes means for receiving, from the mobile device and at a system associated with the information gathering entity, information indicative of events associated with use
(Continued)

of the mobile device, and means for associating the received information with the demographic data.

19 Claims, 21 Drawing Sheets

Related U.S. Application Data division of application No. 15/476,464, filed on Mar. 31, 2017, now Pat. No. 10,085,052, which is a continuation of application No. 14/448,715, filed on Jul. 31, 2014, now Pat. No. 9,615,114, which is a continuation of application No. 12/540,154, filed on Aug. 12, 2009, now Pat. No. 8,806,535, which is a continuation of application No. 11/405,067, filed on Apr. 17, 2006, now Pat. No. 7,587,732, which is a continuation of application No. PCT/US2004/034251, filed on Oct. 15, 2004, which is a continuation-in-part of application No. PCT/US2004/000818, filed on Jan. 14, 2004.

(60) Provisional application No. 60/578,196, filed on Jun. 9, 2004, provisional application No. 60/511,859, filed on Oct. 17, 2003.

(51) Int. Cl.
| | | |
|---|---|---|
| *H04H 60/31* | (2008.01) | |
| *H04H 60/45* | (2008.01) | |
| *H04H 60/52* | (2008.01) | |
| *H04N 21/442* | (2011.01) | |
| *H04N 21/414* | (2011.01) | |
| *H04N 21/439* | (2011.01) | |
| *H04N 21/258* | (2011.01) | |
| *H04H 60/32* | (2008.01) | |
| *H04H 60/33* | (2008.01) | |
| *H04H 60/37* | (2008.01) | |
| *H04H 60/58* | (2008.01) | |

(52) U.S. Cl.
CPC ............ *H04H 60/45* (2013.01); *H04H 60/52* (2013.01); *H04N 21/25883* (2013.01); *H04N 21/41407* (2013.01); *H04N 21/4394* (2013.01); *H04N 21/44204* (2013.01); *H04N 21/44224* (2020.08); *H04H 60/32* (2013.01); *H04H 60/33* (2013.01); *H04H 60/37* (2013.01); *H04H 60/58* (2013.01); *Y10S 707/99935* (2013.01)

(56) References Cited

U.S. PATENT DOCUMENTS

| | | | |
|---|---|---|---|
| 4,905,080 | A | 2/1990 | Watanabe et al. |
| 4,930,011 | A | 5/1990 | Kiewit |
| 5,373,315 | A | 12/1994 | Dufresne et al. |
| 5,382,983 | A | 1/1995 | Kwoh et al. |
| 5,386,494 | A | 1/1995 | White |
| 5,394,461 | A | 2/1995 | Garland |
| 5,412,738 | A | 5/1995 | Brunelli et al. |
| 5,444,769 | A | 8/1995 | Koen et al. |
| 5,481,294 | A | 1/1996 | Thomas et al. |
| 5,483,276 | A | 1/1996 | Brooks et al. |
| 5,621,793 | A | 4/1997 | Bednarek et al. |
| 5,629,739 | A | 5/1997 | Dougherty |
| 5,740,035 | A | 4/1998 | Cohen et al. |
| 5,893,064 | A | 4/1999 | Kudirka et al. |
| 6,005,490 | A | 12/1999 | Higashihara |
| 6,097,441 | A | 8/2000 | Allport |
| 6,157,413 | A | 12/2000 | Hanafee et al. |
| 6,327,619 | B1 | 12/2001 | Blumenau |
| 6,434,614 | B1 | 8/2002 | Blumenau |
| 6,467,089 | B1 | 10/2002 | Aust et al. |
| 6,545,447 | B1 | 4/2003 | Smith |
| 6,577,713 | B1 | 6/2003 | Peterson et al. |
| 6,745,011 | B1 | 6/2004 | Hendrickson et al. |
| 6,754,470 | B2 | 6/2004 | Hendrickson et al. |
| 6,876,970 | B1 | 4/2005 | Silver et al. |
| 6,970,698 | B2 | 11/2005 | Majmundar et al. |
| 7,043,433 | B2 | 5/2006 | Hejna, Jr. |
| 7,239,981 | B2 | 7/2007 | Kolessar et al. |
| 7,379,778 | B2 | 5/2008 | Hayes et al. |
| 7,586,439 | B2 | 9/2009 | Percy et al. |
| 7,587,732 | B2 | 9/2009 | Wright et al. |
| 7,680,889 | B2 | 3/2010 | Blumenau et al. |
| 7,894,703 | B2 | 2/2011 | Lapstun et al. |
| 7,917,130 | B1 | 3/2011 | Christensen et al. |
| 8,375,404 | B2 | 2/2013 | Nielsen et al. |
| 8,539,527 | B2 | 9/2013 | Wright et al. |
| 8,799,937 | B2 | 8/2014 | Nielsen |
| 8,806,535 | B2 | 8/2014 | Wright et al. |
| 10,085,052 | B2 | 9/2018 | Wright et al. |
| 2002/0056089 | A1 | 5/2002 | Houston |
| 2002/0059218 | A1 | 5/2002 | August et al. |
| 2002/0112048 | A1 | 8/2002 | Gruyer et al. |
| 2002/0133393 | A1 | 9/2002 | Tatsumi et al. |
| 2003/0005430 | A1 | 1/2003 | Kolessar |
| 2003/0045301 | A1 | 3/2003 | Wollrab |
| 2003/0074224 | A1 | 4/2003 | Tanabe et al. |
| 2003/0091894 | A1 | 5/2003 | Hsueh |
| 2003/0115586 | A1 | 6/2003 | Lejouan et al. |
| 2003/0170001 | A1 | 9/2003 | Breen |
| 2003/0171833 | A1 | 9/2003 | Crystal et al. |
| 2004/0064319 | A1 | 4/2004 | Neuhauser et al. |
| 2004/0111738 | A1 | 6/2004 | Gunzinger |
| 2004/0203520 | A1 | 10/2004 | Schirtzinger et al. |
| 2005/0033829 | A1 | 2/2005 | Oommen |
| 2005/0172319 | A1 | 8/2005 | Reichardt et al. |
| 2005/0204379 | A1 | 9/2005 | Yamamori |
| 2005/0227614 | A1 | 10/2005 | Hosking et al. |
| 2006/0075111 | A1 | 4/2006 | Auryan et al. |
| 2007/0006250 | A1 | 1/2007 | Croy et al. |
| 2007/0055987 | A1 | 3/2007 | Lu et al. |
| 2008/0021741 | A1 | 1/2008 | Holla et al. |
| 2009/0030066 | A1 | 1/2009 | Kiss |
| 2009/0055854 | A1 | 2/2009 | Wright et al. |
| 2009/0300669 | A1 | 12/2009 | Wright et al. |
| 2010/0048300 | A1 | 2/2010 | Capio |
| 2010/0095319 | A1 | 4/2010 | Tran et al. |
| 2010/0131642 | A1 | 5/2010 | Chalikouras et al. |
| 2010/0169908 | A1 | 7/2010 | Nielsen |
| 2011/0004474 | A1 | 1/2011 | Bansal et al. |
| 2011/0285809 | A1 | 11/2011 | Feng et al. |
| 2012/0023516 | A1 | 1/2012 | Wolinsky et al. |
| 2013/0312019 | A1 | 11/2013 | McMillan |

FOREIGN PATENT DOCUMENTS

| | | |
|---|---|---|
| EP | 0425347 | 5/1991 |
| EP | 0683451 | 11/1995 |
| EP | 0697773 | 2/1996 |
| EP | 0713335 | 5/1996 |
| EP | 0275328 | 7/1998 |
| EP | 1213860 | 6/2002 |
| EP | 1026847 | 9/2002 |
| EP | 1453286 | 9/2004 |
| JP | 2002051274 | 2/2002 |
| JP | 2000307530 | 11/2002 |
| WO | 9810539 | 3/1998 |
| WO | 0245273 | 6/2002 |
| WO | 03061285 | 7/2003 |
| WO | 03077455 | 9/2003 |

(56) References Cited

FOREIGN PATENT DOCUMENTS

| WO | 03049412 | 12/2003 |
|---|---|---|
| WO | 2005038625 | 4/2005 |

OTHER PUBLICATIONS

Australian Intellectual Property Office, "First Examiner's Report," mailed in connection with corresponding Australian Patent Application No. 2011200553, dated Feb. 23, 2011, (3 pages).
State Intellectual Property Office of China, "Rejection Decision," mailed in connection with corresponding Chinese Patent Application No. 200480033792.7, dated Feb. 22, 2011, (9 pages).
European Patent Office, "Summons to Attend Oral Proceedings Pursuant to Rule 115(1) EPC," mailed in connection with corresponding European Application No. 04795418.5, dated Mar. 16, 2011, (7 pages).
European Patent Office, "Provision of the Minutes in Accordance with Rule 124(4) EPC," mailed in connection with corresponding European Application No. 04795418.5, dated Jul. 7, 2011, (25 pages).
European Patent Office, "Result of Consultation," mailed in connection with corresponding European Application No. 04795418.5, dated Jul. 7, 2011, (6 pages).
European Patent Office, "Extended European Search Report," mailed in connection with corresponding European Application No. 10011301.8, dated Jan. 18, 2011, (8 pages).
United States Patent and Trademark Office, "Notice of Allowance," mailed in connection with corresponding U.S. Appl. No. 12/540,154, dated Aug. 30, 2011, (7 pages).
Mexico Patent Office, "Office Action" mailed in connection wtih Mexican Application No. PA/a/2006/004286, dated May 12, 2009, and corresponding English translation, (6 pages).
European Patent Office, "Communication and Supplementary European Search Report," mailed in connection with EP 04795418.5, dated Feb. 8, 2007, (3 pages).
Patent Cooperation Treaty, "International Preliminary Report on Patentability," mailed in connection with PCT/US04/34251, dated Jan. 23, 2006, (6 pages).
Patent Cooperation Treaty, "Corrected International Search Report," mailed in connection with PCT/US04/34251, dated Jul. 22, 2005, (3 pages).
Patent Cooperation Treaty, "Corrected Written Opinion of the International Searching Authority," mailed in connection with PCT/US04/34251, dated Jul. 22, 2005, (3 pages).
IP Australia, "Examiner's First Report," mailed in connection with Australian Patent Application No. 2004282954, dated Aug. 19, 2009, (2 pages).
IP Australia, "Notice of Acceptance," mailed in connection with Australian Patent Application No. 2004282954, dated Nov. 2, 2010, (3 pages).
Canadian Intellectual Property Office, "Office Action," mailed in connection with Canadian Application No. 2,543,017, dated Dec. 14, 2010, (3 pages).
IP Australia, "Second Examiner's Report," mailed in connection with corresponding Australian Patent Application No. 2011200553, dated Mar. 23, 2012 (2 pages).
State Intellectual Property Office of China, "Office Action," mailed in connection with Canadian Application No. 2,543,017, dated Feb. 14, 2012 (4 pages).
European Patent Office, "Examination Report," mailed in connection with corresponding European Application No. 10011301.8, dated May 21, 2012 (8 pages).
Taiwan Intellectual Property Office, "First Examination Report," mailed in connection with corresponding Taiwan Patent Application No. 093131327, dated Sep. 19, 2011 (11 pages).
United States Patent and Trademark Office, "Non-final Office Action," mailed in connection with U.S. Appl. No. 11/405,067, dated Oct. 16, 2007 (8 pages).
United States Patent and Trademark Office, "Final Office Action," mailed in connection with U.S. Appl. No. 11/405,067, dated Apr. 15, 2008 (9 pages).
United States Patent and Trademark Office, "Non-final Office Action," mailed in connection with U.S. Appl. No. 11/405,067, dated Aug. 22, 2008 (10 pages).
United States Patent and Trademark Office, "Final Office Action," mailed in connection with U.S. Appl. No. 11/405,067, dated Mar. 11, 2009 (11 pages).
United States Patent and Trademark Office, "Notice of Allowance," mailed in connection with U.S. Appl. No. 11/405,067, dated May 20, 2009 (6 pages).
United States Patent and Trademark Office, "Supplemental Notice of Allowance," mailed in connection with U.S. Appl. No. 11/405,067, dated Jul. 24, 2009 (2 pages).
United States Patent and Trademark Office, "Notice of Allowance," mailed in connection with U.S. Appl. No. 12/540,154, dated Apr. 13, 2012 (7 pages).
Government of India Patent Office, "First Examination Report," mailed in connection with IN Patent Application No. 2379/delnp/2006, dated May 28, 2012 (2 pages).
IP Australia, "Third Examiner's Report," mailed in connection with corresponding Australian Patent Application No. 2011200553, dated Aug. 21, 2012 (3 pages).
IP Australia, "Fourth Examiner's Report," mailed in connection with corresponding Australian Patent Application No. 2011200553, dated Nov. 21, 2012 (3 pages).
IP Australia, "Notice of Acceptance," mailed in connection with corresponding Australian Patent Application No. 2011200553, dated Dec. 3, 2012 (3 pages).
State Intellectual Property Office of China, "Decision of Reexamination," mailed in connection with Chinese Application No. 200480033792.7, dated Dec. 19, 2012 (10 pages).
State Intellectual Property Office of China, "Office Action," mailed in connection with Chinese Application No. 201110155719.9, dated Sep. 5, 2012 (8 pages).
United States Patent and Trademark Office, "Non-Final Office Action," mailed in connection with U.S. Appl. No. 13/017,907, dated Dec. 6, 2012 (11 pages).
United States Patent and Trademark Office, "Notice of Allowance," mailed in connection with U.S. Appl. No. 13/017,907, dated May 15, 2013 (7 pages).
Canadian Intellectual Property Office, "Office Action," mailed in connection with Canadian Patent Application No. 2,652,655, dated Jul. 7, 2015 (5 pages).
Canadian Intellectual Property Office, "Notice of Allowance," mailed in connection with Application No. 2,543,017, dated Mar. 4, 2013 (1 page).
State Intellectual Property Office, "Second Office Action," mailed in connection with Chinese Application No. 200480033792.7, dated Apr. 23, 2010 (3 pages).
State Intellectual Property Office, "First Office Action," mailed in connection with Chinese Application No. 200480033792.7, dated Jul. 17, 2009 (2 pages).
State Intellectual Property Office, "Notification for Reexamination," mailed in connection with Chinese Application No. 201110155719.9, dated Jan. 28, 2015 (8 pages).
European Patent Office, "Decision to Grant," mailed in connection with Application No. 04795418.5, dated May 10, 2012 (3 pages).
Taiwan Intellectual Property Office, "Notice of Allowance," mailed in connection with Taiwan Application No. 093131327, dated Jul. 30, 2012 (3 pages).
State Intellectual Property Office of China, "Reexamination Decision," mailed in connection with Chinese Application No. 201110155719.9, dated Jun. 29, 2015 (9 pages).
United States Patent and Trademark Office, "Non-Final Office Action," mailed in connection with U.S. Appl. No. 13/473,358, dated Apr. 10, 2014 (21 pages).
United States Patent and Trademark Office, "Final Office Action," mailed in connection with U.S. Appl. No. 13/473,358, dated Oct. 29, 2014 (21 pages).

(56) References Cited

OTHER PUBLICATIONS

United States Patent and Trademark Office, "Non-Final Office Action," mailed in connection with U.S. Appl. No. 13/473,358, dated May 7, 2015 (21 pages).

United States Patent and Trademark Office, "Notice of Allowance", mailed in connection with U.S. Appl. No. 13/473,358, dated Aug. 28, 2015 (7 pages).

United States Patent and Trademark Office, "Notice of Allowability," mailed in connection with U.S. Appl. No. 13/473,358, dated Sep. 11, 2015 (7 pages).

State Intellectual Property Office of China, "Notice of Completion of Formalities for Patent Registration," mailed in connection with Chinese Application No. 201110155719.9, dated Oct. 10, 2015 (5 pages).

State Intellectual Property Office of China, "Office Action", mailed in connection with Chinese Patent Application No. 201310115747.7, dated Nov. 4, 2015 (8 pages).

State Intellectual Property Office of China, "Notice of Allowance", mailed in connection with Chinese Patent Application No. 201310115747.7, dated Jul. 4, 2016 (4 pages).

United States Patent and Trademark Office, "Final Office Action", mailed in connection with U.S. Appl. No. 12/088,802, dated Jun. 13, 2016 (36 pages).

United States Patent and Trademark Office, "Notice of Allowance," mailed in connection with U.S. Appl. No. 14/448,715, dated Nov. 18, 2016 (8 pages).

United States Patent and Trademark Office, "Non-final Office Action," mailed in connection with U.S. Appl. No. 14/448,715, dated Jul. 1, 2016 (22 pages).

Intellectual Property Office of India, "Examination Report," mailed in connection with Indian Patent Application No. 4713/DELNP/2013, dated Nov. 5, 2019, 7 pages.

United States Patent and Trademark Office, "Notice of Allowance," mailed in connection with U.S. Appl. No. 16/140,231, dated Jul. 15, 2020 (8 pages).

United States Patent and Trademark Office, "Final Office Action," mailed in connection with U.S. Appl. No. 16/140,231, dated Apr. 29, 2020 (6 pages).

United States Patent and Trademark Office, "Non-final Office Action," mailed in connection with U.S. Appl. No. 16/140,231, dated Oct. 21, 2019 (8 pages).

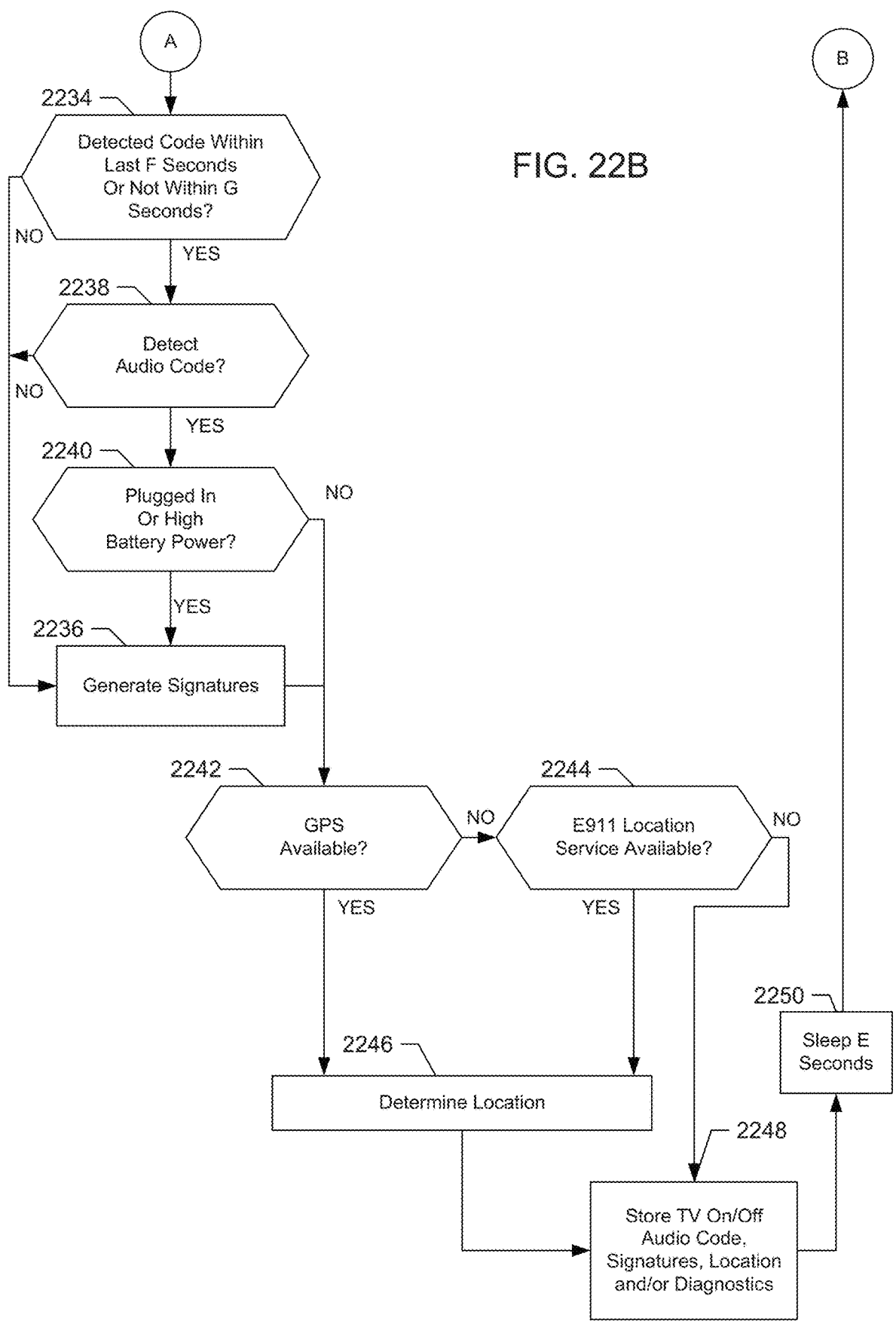

PORTABLE MULTI-PURPOSE AUDIENCE MEASUREMENT SYSTEMS, APPARATUS AND METHODS

RELATED APPLICATIONS

This patent arises from a continuation of U.S. patent application Ser. No. 16/140,231 (now U.S. Pat. No. 10,848, 804), filed Sep. 24, 2018, which is a divisional of U.S. patent application Ser. No. 15/476,464 (now U.S. Pat. No. 10,085, 052), filed Mar. 31, 2017, which is a continuation of U.S. patent application Ser. No. 14/448,715 (now U.S. Pat. No. 9,615,114), filed Jul. 31, 2014, which is a continuation of U.S. patent application Ser. No. 12/540,154 (now U.S. Pat. No. 8,806,535), filed Aug. 12, 2009, which is a continuation of U.S. patent application Ser. No. 11/405,067 (now U.S. Pat. No. 7,587,732), filed Apr. 17, 2006, which is a continuation of International Application Number PCT/US2004/ 034251, filed Oct. 15, 2004, which is a continuation-in-part of International Application Number PCT/US2004/000818, filed Jan. 14, 2004, and which claims the benefit of U.S. Provisional Patent Application Ser. No. 60/511,859, filed Oct. 17, 2003, and U.S. Provisional Patent Application Ser. No. 60/578,196, filed Jun. 9, 2004, all of which are hereby incorporated by reference in their respective entireties.

FIELD OF THE DISCLOSURE

The present disclosure relates generally to audience measurement, and more particularly, to portable multi-purpose audience measurement systems, apparatus and methods.

BACKGROUND

Determining the size and demographics of a television viewing audience helps television program producers improve their television programming and determine a price for advertising during such programming. In addition, accurate television viewing demographics allows advertisers to target certain types and sizes of audiences.

In order to collect these demographics, an audience measurement company may enlist a plurality of television viewers to cooperate in an audience measurement study for a predefined length of time. The viewing habits of these enlisted viewers as well as demographic data about these enlisted viewers is collected and used to statistically determine the size and demographics of a television viewing audience. In some cases, automatic measurement systems may be supplemented with survey information recorded manually by the viewing audience members.

The process of enlisting and retaining participants for purposes of audience measurement can be a difficult and costly aspect of the audience measurement process. For example, participants must be carefully selected and screened for particular characteristics so that the population of participants is representative of the overall viewing population. In addition, the participants must be willing to perform specific tasks that enable the collection of the data and, ideally, the participants selected must be diligent about performing these specific tasks so that the audience measurement data accurately reflects their viewing habits.

For example, audience measurement systems typically require some amount of on-going input from the participating audience member. One method of collecting viewer input involves the use of a people meter. A people meter is an electronic device that is typically disposed in the viewing area and that is proximate to one or more of the viewers. The people meter is adapted to communicate with a television meter disposed in, for example, a set top box, that measures various signals associated with the television for a variety of purposes including, but not limited to, determining the operational status of the television, i.e., whether the television is off or on, and identifying the programming being displayed by the television. Based on any number of triggers, including, for example a channel change or an elapsed period of time, the people meter prompts the household viewers to input information by depressing one of a set of buttons each of which is assigned to represent a different household member. For example, the people meter may prompt the viewers to register, i.e., log in, or may prompt the viewers to indicate that they are still present in the viewing audience. Although periodically inputting information in response to a prompt may not be burdensome when required for an hour, a day or even a week or two, some participants find the prompting and data input tasks to be intrusive and annoying over longer periods of time.

In addition to performing tasks associated with viewing, participants must also be willing to have their media systems modified to enable measurement of their viewing habits, a requirement that typically involves allowing field personnel to gain access to their homes. Allowing access to the home is often viewed as intrusive by would-be participants and requires the would-be participant to schedule a time to allow such access. The would-be participant may also be unwilling to risk the damage that may occur as a result of allowing field personnel to modify an expensive home media system.

Moreover, there are costs associated with engaging and training field personnel who not only install such audience measurement systems in the homes of participants but who also return to the homes on an as-needed basis to repair the equipment and to remove the equipment when the participants are either no longer willing to participate, have moved from their homes, or have reached the end of the term for which they originally agreed to participate.

To reduce the costs and resources required to enlist and retain participants and to engage and train field support, audience measurement companies are researching ways to make participation as convenient as possible for the participants and to minimize the amount of in-home installation/ repair required to support in-home audience measurement.

Another aspect of audience measurement involves attempting to measure not only viewing that occurs within the home, referred to as in-home viewing, but also viewing that occurs outside of the home, referred to as out-of-home viewing. In today's world, the average viewer is frequently exposed to media sources outside the home. Specifically, televisions and display monitors are encountered in places such as airports, shopping centers, retail establishments, restaurants, and bars, to name only a few locations. To measure out-of-home television viewing, portable devices have been developed to capture audio codes from the audio signals emanating from a television set. These codes are later transmitted to a central data processing facility which uses the codes to identify the programming that was viewed and to properly credit that viewing to the appropriate program. Because such devices are portable, they may be used to measure viewing that occurs both inside the home and outside the home. Unfortunately, these portable audio code detection devices have inherent limitations.

Specifically, these portable devices are unable to distinguish between codes captured as a result of in-home viewing and codes captured as a result of out-of-home viewing. Yet there are characteristic differences between in-home television viewing and out-of-home television viewing that may be of interest to consumers of audience measurement data. Specifically, an in-home viewer often focuses much or all of his attention on the television program being viewed. In contrast, out-of-home television viewing may involve the focused attention of the viewer or may instead involve a brief glance at a television screen as the viewer walks past a television located, for example, in an airport. In addition, in-home television viewing is typically performed on a selective basis, i.e., the viewer likely has control over the selection of programming displayed on the in-home television, whereas out-of-home viewing is less likely to be performed on a selective basis, i.e., the out-of-home viewer is less likely to have individual control over the selection of the programming being displayed on the out-of-home television.

Thus, audience measurement companies are researching ways to distinguish between data associated with in-home television viewing and data associated with out-of-home television viewing.

DETAILED DESCRIPTION

Although the following discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware, and/or software.

In addition, while the following disclosure is made with respect to example television systems, it should be understood that the disclosed system is readily applicable to many other media systems. Accordingly, while the following describes example systems and processes, persons of ordinary skill in the art will readily appreciate that the disclosed examples are not the only way to implement such systems.

Figure 1:
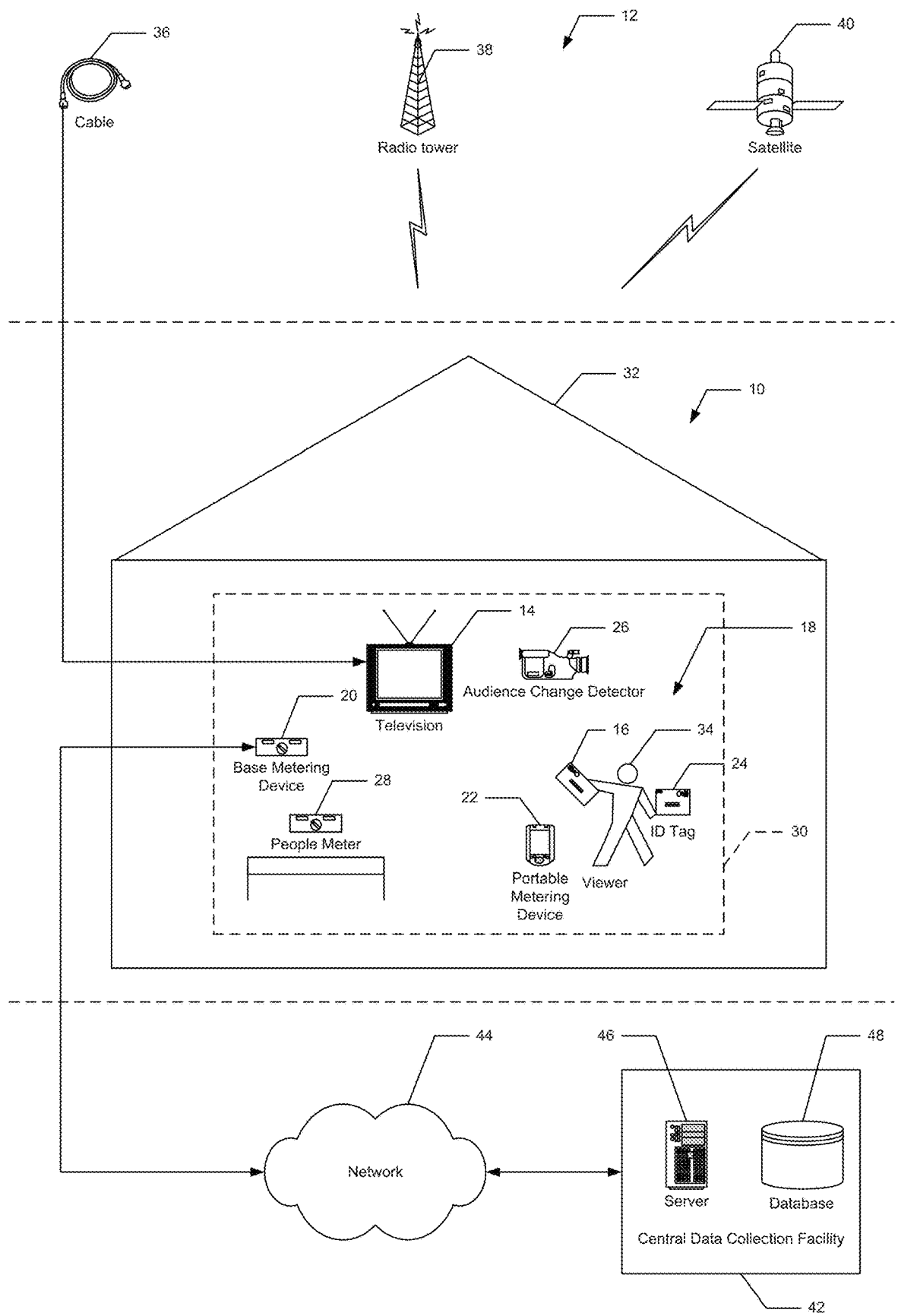
FIG. 1 is a block diagram representation of an example television system.

In the example of FIG. 1, an example television system 10 including a television service provider 12, a television 14, and a remote control device 16 is metered using an audience measurement system 18 having a base metering device 20, a portable metering device 22, an identification tag 24, an audience change detector 26, and a people meter 28. The components of the television system 10 may be coupled in any well-known manner, such as that shown in FIG. 1. The television 14 is positioned in a viewing area 30 located within a house 32 occupied by one or more people, referred to as household members 34, all of whom have agreed to participate in an audience measurement research study. The viewing area 30 includes the area in which the television 14 is located and from which the television 14 may be viewed by one or more household members 34 located in the viewing area 30.

The television service provider 12 may be implemented using any television service provider 12 such as, but not limited to, a cable television service provider 36, a radio frequency (RF) television provider 38, and/or a satellite television service provider 40. The television 14 receives a plurality of television signals transmitted via a plurality of channels by the television service provider 12 and may be adapted to process and display television signals provided in any format such as an National Television Standards Committee (NTSC) television signal format, a high definition television (HDTV) signal format, an Advanced Television Systems Committee (ATSC) television signal format, a phase alternation line (PAL) television signal format, a digital video broadcasting (DVB) television signal format, an Association of Radio Industries and Businesses (ARIB) television signal format, etc. The user-operated remote control device 16 allows a user to cause the television 14 to tune to and receive signals transmitted on a desired channel, and to cause the television 14 to process and present the programming content contained in the signals transmitted on the desired channel. The processing performed by the television 14 may include, for example, extracting a video component delivered via the received signal and an audio component delivered via the received signal, causing the video component to be displayed on a screen/display associated with the television 14, and causing the audio component to be emitted by speakers associated with the television. The programming content contained in the television signal may include, for example, a television program, a movie, an advertisement, a video game, and/or a preview of other programming that is or will be offered by the television service provider 12 now or in the future.

The base metering device 20 is configured as a primarily stationary device disposed on or near the television 14 and may be adapted to perform one or more of a variety of well-known television metering methods. Depending on the types of metering that the base metering device 20 is adapted to perform, the base metering device 20 may be physically coupled to the television 14 or may instead be configured to capture signals emitted externally by the television 14 such that direct physical coupling to the television 14 is not required. Preferably, a base metering device 20 is provided for each television 14 disposed in the household 32, such that the base metering devices 20 may be adapted to capture data regarding all in-home viewing by the household members. In one embodiment, the base metering device 20 may be implemented as a low-cost electronic device that may be shipped to the viewer's home 32 (e.g., via regular mail) and easily installed by the viewer by, for example, plugging the base metering device 20 into a commercial power supply, i.e., an electrical outlet.

The portable metering device 22 is adapted to perform television metering using well-known audio code capture techniques and/or audio signature capture techniques. The portable metering device 22 may be adapted to capture code information and signature information simultaneously. Alternatively, the portable metering device 22 may be adapted to use the code techniques as a primary metering method and to use the signature metering method as a secondary method, i.e., to supplement the metering performed using the code technique. Specifically, if one or more audio codes are detected by the portable metering device 22, then the signature method need not be performed. Conversely, if audio codes are not detected, then the portable metering device 22 may execute one or more well-known methods used to capture signature information of the programming content displayed on the television 14 for purposes of metering viewing. The portable metering device 22 may be adapted to capture and process codes that are embedded in the programming content using an encoding technique such as that disclosed in pending U.S. patent application Ser. No. 09/543,480. Preferably, a different portable metering device 22 is assigned to each household member 34 residing in the home 32 and each household member 34 carries the appropriate portable metering device 22 at all times.

Referring still to FIG. 1, the base metering device 20 and the portable metering device 22 may be adapted to communicate with a remotely located central data collection facility 42 via a network 44. The network 44 may be implemented using any type of public or private network such as, but not limited to, the Internet, a telephone network, a local area network (LAN), a cable network, and/or a wireless network. To enable communication via the network 44, the base metering device 20 may include a communication interface that enables connection to an Ethernet, a digital subscriber line (DSL), a telephone line, a coaxial cable, or any wireless connection, etc. Likewise, the portable metering device 22 may include such an interface to enable communication by the portable metering device 22 via the network 44. As will be appreciated by persons of ordinary skill in the art, either or both of the base metering device 20 and the portable metering device 22 may be adapted to send viewing data to the central data collection facility 42. In the event that only one of the base metering device 20 and the portable metering device 22 is capable of transmitting data to the central data collection facility 42, the base and portable metering devices 20, 22 may be adapted to communicate data to each other so that there is a means by which data collected from all metering devices (i.e., the base metering device 20 and/or the portable metering device 22) can be transmitted to the central data collection facility 42. The central data collection facility 42 may include a server 46 and a database 48. Further, the central data collection facility 42 may be adapted to process and store data received from the base metering device 20 and/or the portable metering device 22.

The portable metering device 22 may also communicate via the network 44 using a docking station (not shown) having a cradle in which the portable metering device 22 may be deposited in order to enable transfer of data via the network 44 and to enable a battery (not shown) disposed in the portable metering device 22 to be recharged. The docking station may be operatively coupled to the network 44 via, for example, an Ethernet connection, a digital subscriber line (DSL), a telephone line, a coaxial cable, etc.

In the illustrated example, the portable metering device 22 is a portable electronic device such as, but not limited to, a portable telephone, a personal digital assistant (PDA), and/or a handheld computer. Because of its portability, the portable metering device 22 may be used to meter viewing that occurs at home, at the office, and/or any other location. For example, the portable metering device 22 may be configured to detect a movie and/or a movie preview at a movie theater. Of course, the portable metering device 22 also includes a battery (not shown) for powering the electronic circuitry disposed therein.

A portable telephone 22 used to implement the portable metering device 22 may be configured to operate in accordance with any wireless communication protocol such as, but not limited to, a code division multiple access (CDMA) based communication protocol, a time division multiple access (TDMA) based communication protocol, a global system for mobile communication (GSM) based communication protocol, a general packet radio services (GPRS) based communication protocol, an enhanced data GSM environment (EDGE) based communication protocol, a universal mobile telephone service (UMTS) based communication protocol or any other suitable wireless communication protocol. As will be appreciated by persons of ordinary skill in the art, the communication capabilities of the portable telephone may be used to enable communication of data from the portable metering device 22 to the central data collection facility 42 via the network 44. Using a portable telephone to implement the portable metering device 22 may allow the household member 34 to meet the research compliance requirements more easily and more conveniently. Specifically, the household member 34 may already carry a portable telephone on a regular basis such that carrying a portable metering device 22 implemented using a cellular telephone does not place any additional duties upon the household member 34 that the household member 34 does not already perform.

A PDA or a handheld computer used to implement the portable metering device 22 may be configured to communicate with an access point (not shown) in accordance with a short-range wireless communication protocol such as, but not limited to, a Bluetooth based communication protocol, a communication protocol that conforms to any of the Institute of Electrical and Electronics Engineers (IEEE) standards 802.11a, 802.11b, or 802.11g, or any other suitable short-range wireless communication protocol. In turn, the access point may be operatively coupled to the network 44 via, for example, an Ethernet connection, a digital subscriber line (DSL), a telephone line, a coaxial cable, a wireless telephone connection, etc. To ensure that the PDA can detect audio codes, the PDA preferably includes a microphone having automatic gain control as do a number of PDAs currently available on the market.

The audience measurement system 18 may be configured so that the base metering device 20 is adapted to be the primary source to collect all in-home viewing data and the portable metering device 22 is used as the primary source to collect all out-of-home viewing data. In yet another embodiment, the base metering device 20 may meter all in-home viewing, and the portable metering device 22 may meter all in-home and out-of-home viewing and duplicate viewing data sets collected for in-home viewing may be compared and processed to ensure that such data is credited to reflect only a single viewing. The redundant sets of data may also be used to identify discrepancies between the data and to eliminate data believed to be erroneous. In a still further embodiment, the audience measurement system 18 may be configured such that the base metering device 20 is able to detect the presence and absence of the portable metering device 22 and to use such information to determine whether metering is necessary. For example, if the base metering device 20 determines that the television 14 is turned on but there is no portable metering device 22 located in the viewing area then the base metering device 20 may begin metering the programming being displayed on the television 14. Conversely, if the base metering device 20 detects a portable metering device 22 in the viewing area 30, then the base metering device 20 may halt monitoring.

In another embodiment, if the base metering device 20 detects a portable metering device 22 in the viewing area 30, then the base metering device 20 may halt monitoring and begin emitting a signal detectable by any portable metering devices 22 located in the viewing area 30. The portable metering devices 22 may respond to the signal emitted by the base metering device 20 by causing the subsequently collected data to be identified as in-home viewing data thus allowing data collected via the portable metering devices 22 in connection with in-home viewing to be distinguishable from data collected by the portable metering devices 22 in connection with out-of-home viewing. The portable metering devices 22 may continue to identify data collected as being in-home viewing data until the signal is no longer detected by the portable metering devices 22, i.e., one of the portable metering devices 22 has been removed from the viewing area 30. Or, the base metering device 20 may emit the signal only periodically and the portable metering devices 22 may be adapted to identify data that is subsequently collected over a predefined time period as being associated with in-home viewing, wherein the predefined time period is related to the periodicity at which the base metering device 20 emits the signal.

In another embodiment, the base metering device 20 may be replaced with a device that does not perform any metering functions but is only capable of generating a signal to be received by portable metering devices 22 located in the viewing area 30. These signal generating devices may be adapted to generate signals for capture by portable metering devices 22 located in the viewing area 30, and the portable metering devices 22 may be adapted to use the signals to identify data that is collected in connection with in-home viewing. Of course, in such an embodiment, the portable metering devices 22 are the sole metering devices and, therefore, the household members' willingness to carry the portable devices assigned to them is critical to the accuracy and completeness of the data collected thereby.

In a yet further embodiment, the audience measurement system 18 may be adapted to include an audience change detector 26, such as that disclosed in PCT Patent Application Serial No. PCT/US02/39619 which is incorporated by reference herein, for identifying the number of household members 34 located in the viewing area 30. The audience change detector 26 may communicate this number to the base metering device 20 which may then compare that number to the number of portable metering devices 22 detected by the base metering device 20. If the number of detected portable metering devices 22 matches the number of household members 34 located in the viewing area 30, then the base metering device 20 need not meter the viewing because the viewing will be captured by the portable metering devices 22. If, instead, the numbers do not agree, then one or more household members 34 may not be carrying their assigned portable metering device 22, and the base metering device 20 may be adapted to meter the viewing to ensure capture of the viewing data.

The base metering device 20 may be adapted to detect the presence of one or more of the portable metering devices 22 in the viewing area 30 through the use of a short range signal transmitter/receiver disposed in the base metering device 20 and a short range signal transmitter/receiver disposed in the portable metering device 22. The short range signals transmitted between the base metering device 20 and the portable metering device 22 may be, for example, infrared signals, and may be adapted to provide information that identifies the household member 34 assigned to carry the portable metering device 22 and the short range signals may further be adapted to provide information about whether the short range signal originated from a portable metering device 22 or originated from a short range signal transmitter associated with, for example, one of the identification tags 24 to be worn by one or more of the household members 34. Such identification tags 24 may be adapted to be embedded in jewelry, watches, clothing, etc. to decrease the likelihood that the household member 34 assigned to the identification tag 24 is opposed to wearing the identification tag 24 and may be especially useful for viewers who do not wish to carry the portable metering device 22 while in the home 32 or for household members 34, such as small children, who are not well suited for reliably carrying a portable metering device 22. The identification tags 24 may also be adapted to generate signals that provide the identity of the household member 34 assigned to wear the identification tag 24 as well as the type of device, i.e., a portable metering device 22 or an identification tag 24, from which the signals originated. The base metering device 20 may be adapted to respond to a short range signal emitted by a portable metering device 22 differently from a short range signal emitted by an identification tag 24. Further, the identification tag 24 does not have metering capabilities. Therefore, the detection of a signal emitted by the identification tag 24 will not eliminate the need for the base metering device 20 to meter viewing. In contrast, the portable metering device 22 does have metering capabilities such that the base metering device 20 may be configured to respond to a signal transmitted by a portable metering device 22 by altering its metering procedure, i.e., the base metering device 20 may stop metering and/or may emit a signal for capture by the portable metering device 22 as described above.

The use of both identification tags 24 and portable metering devices 22 that are detectable by the base metering device 20 allows the household members 34 a greater range of flexibility in terms of complying with the requirements of the audience measurement research company. In addition, the use of detectable identification tags 24 and portable metering devices 22 enables the audience measurement system 18 to more accurately identify the members of the viewing audience even when such members are not complying with the research requirements. For example, in a further embodiment, the audience measurement system 18 may be configured such that the base metering device 20 is adapted to use information collected from the identification tags 24 located in the viewing area 30, from the portable metering devices 22 located in the viewing area 30, and from the audience change detector 26 to deduce the identities of household members 34 located in the viewing area 30 who are not carrying a portable metering device 22 and who are not wearing an identification tag 24. In such an embodiment, the base metering device 20 may compare the number of household members 34 detected in the viewing area 30 using the audience change detector 26 and may compare this number to the number of people identified via signals received from identification tags 24 and from portable metering devices 22. If these numbers are the same, then no deduction is necessary as the base metering device 20 can identify each household member 34 using the signals generated by the identification tags 24 and the portable metering devices 22.

If, instead, the number of household members 34 identified in the viewing area 30 by the audience change detector 26 is greater than the number of household members 34 identified in the viewing area 30 using the signals generated by identification tags 24 and the portable metering devices 22, then the base metering device 20 may determine the number of household members 34 present in the viewing area 30 who are not associated with an identification tag 24 or a portable metering device 22 and may use a master list of household members 34 to identify household members 34 for whom an identification tag 24 signal or a portable metering device 22 signal has not been received. For example, if the household 32 has two adults and a single child, the audience change detector 26 identifies three people in the viewing area 30, and the signals originating from the identification tags 24 indicate that two of the viewers located in the viewing area 30 are the adults, then the base metering device 20 identifies the unidentified household member 34 as the child who lives in the household 32. If, instead, two adults and two children live in the metered household 32, and if the signals originating from the identification tags 24 indicate that two of the household members 34 located in the viewing area 30 are the adults, then the base metering device 20 identifies the unidentified household member 34 as one of the two children living in the household 32. If the audience change detector 26 detects four people in the viewing area 30 of a household 32 only having three members 34, then the base metering device 20 may assume that a visitor is present in the viewing area 30.

In yet another embodiment, the audience measurement system 18 may include a people meter 28 disposed in the viewing area 30, preferably within comfortable reach of the household members 34, and having a set of buttons (not shown) disposed thereon. Each button may be assigned to represent a single, different one of the household members 34 residing within the household 32. The people meter 28 may be adapted to periodically prompt the household members 34, via a set of LEDs, a display screen, and/or an audible tone, to indicate that they are present in the viewing area 30 by pressing their assigned button. To decrease the number of prompts, and thus the number of intrusions imposed upon the household members' 34 television watching experience, the base metering device 20 may be adapted to cause the people meter 28 to prompt only when unidentified household members 34 are located in the viewing area 30 and/or to prompt only the unidentified viewers 34 as determined by a process of elimination performed by the base metering device 20 using information received from identification tags 24 and/or portable metering devices 22 located in the viewing area 30. For example, if the base metering device 20 uses the audience change detector 26 to detect that two household members 34 are located in the viewing area 30, but an identification signal has only been received from the identification tag 24 assigned to the male, adult household member 34, then the base metering device 20 may cause the people meter 28 to prompt only the female, adult household member 34 and the child household member 34 in an attempt to identify the unidentified household member 34. If a response to the prompt is received, then the base metering device 20 may use the response to identify the additional viewer and to associate this identity with collected viewing data. If no response is received, then the base metering device 20 may assume that a visitor is present in the viewing area 30 and may credit the viewing accordingly.

The people meter 28 may be implemented as a stand alone device that is communicatively coupled to the base metering device 20 or as an integral part of the base metering device 20. In one embodiment, the people meter 28 may be implemented as an integral part of the remote control device 16. In another embodiment, the people meter 28 may be implemented using a PDA or a cellular telephone that is kept within comfortable arms reach of the viewers located in the viewing area 30. In such an embodiment, the PDA or portable telephone may be adapted to include all of the components disposed, in or associated with, the portable metering device 22 except for the television audience measurement circuitry. Further the PDA-based or portable phone-based people meter 28 may be programmed to perform any of a variety of well-known people prompting routines. Because people meters are well-known in the art and may be implemented using any of a variety of well-known configurations further detail regarding an implementation of the people meter 28 is not provided herein.

Figure 2:
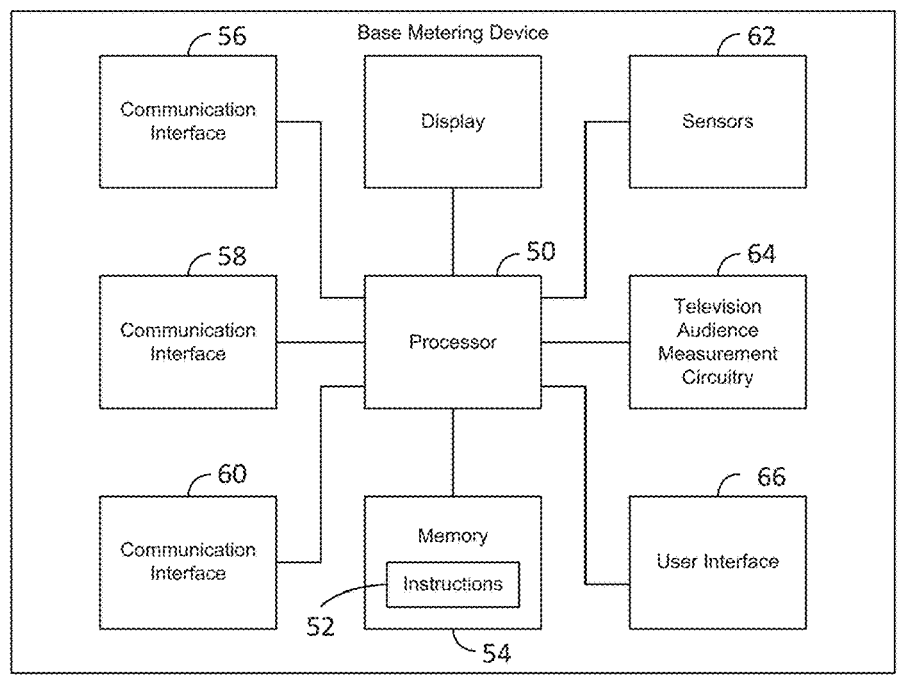
FIG. 2 is a block diagram representation of an example base metering device.

Referring now to FIG. 2, in one embodiment, the base metering device 20 may be equipped with a processor 50 which executes a set of instructions 52 stored in a memory 54 to control the operation of the base metering device 20 in a manner that enables the functionality described herein. The program or the set of operating instructions 52 may be embodied in a computer-readable medium such as a programmable gate array, an application specific integrated circuit (ASIC), an erasable programmable read only memory (EPROM), a read only memory (ROM), a random access memory (RAM), a magnetic media, an optical media and/or any other suitable type of medium. The base metering device 20 may also be equipped with a first communication interface 56 that allows communication between the base metering device 20 and the remotely located central data collection facility 42 via the network 44, a second communication interface 58 that enables the transfer of viewing data between the base metering device 20 and the portable metering device 22, a third communication interface 60 that enables the communication of identification information between the base metering device 20 and the portable metering device 22, one or more sensors 62 for detecting signals being emitted by the television 14 and any circuitry 64 necessary to perform one or more methods of television audience measurement. Of course, the communication interfaces 56, 58, and 60 are optional in nature.

As will be appreciated by persons of ordinary skill in the art, there are a variety of well-known ways to configure the sensors 62 and circuitry 64 to enable television audience measurement. Any given configuration will depend on the method of television audience measurement being employed. As a result, further detail regarding this circuitry is not provided herein. Moreover, although the television audience measurement circuitry 64 is shown in FIG. 2 as a separate component for the base metering device 20, the circuitry 64 may be integral with any of the other base metering device 20 components such as the processor 50 and memory 54. The first communication interface 56 may be implemented using any, conventional communication interface capable of enabling communication with the central data collection facility 42 via the network 44 including for example, an Ethernet card, a digital subscriber line, a coaxial cable, or any wireless connection. The second and third communication interfaces 58, 60 enable communication between the base metering device 20 and the portable metering device 22, and in one embodiment, may be implemented in a single communication interface. The second communication interface 58 enables transfer of viewing data between the base metering device 20 and the portable metering device 22. In most cases, the data transfer may occur regardless of proximity between the base metering device 20 and the portable metering device 22 such that the second communication interface 58 may allow wireless communication between the devices 20, 22 where remotely situated relative to each other. The primary reason for viewing data transfer between the devices 20, 22 will be for the purpose of consolidating household viewing data before the data is transmitted to the central data collection facility 42. If desired, each base metering device 20 and portable metering device 22 may be adapted to separately communicate viewing data to the central data collection facility 42 such that viewing data transfer between the base metering device 20 and the portable metering device 22 need not occur, thereby eliminating the need for the second communication interface 58. The third communication interface 60 enables short range communication between the base metering device 20 and the portable metering device 22 and is configured to allow such communication only when the base metering device 20 and the portable metering device 22 are within a predefined distance of each other. By limiting communication of identification signals to a predefined distance, the third communication interface 60 to enables the detection of a portable metering device 22 by the base metering device 20, only when the portable metering device 22 is within the viewing area, provided, of course, that the predefined distance is shorter then the farthest distance a household member 34 can be located from the base metering device 20 and still be located in the viewing area 30. As a result, the base metering device 20 will not erroneously count a household member as being a viewer, i.e., located in the viewing area 30, when the household member 34 is in fact, located outside of the viewing area 30. The base metering device 20 may additionally include a user interface 66 by which the household member 34 may inform the base metering device 20 of their identities and by which the household members 34 may enter demographic information about themselves including, for example, age, race, sex, household income, etc. The processor 50 causes the identities of each household member 34 and each household member's 34 corresponding demographic information to be stored in the memory 54. This information may subsequently be transmitted by the base metering device 20 to the central data collection facility 42. Alternatively, the remote control device 16 may be adapted to accept the input of this identity and demographic information and to transmit this information to the base metering device 20 for storage therein. In yet another embodiment, the portable metering device 22 may include a user interface at which the user may enter this identity and demographic information as described in detail below. The information may subsequently be transmitted by the portable metering device 22 to the base metering device 20 or by the portable metering device 22 to the central data collection facility 42.

Figure 3:
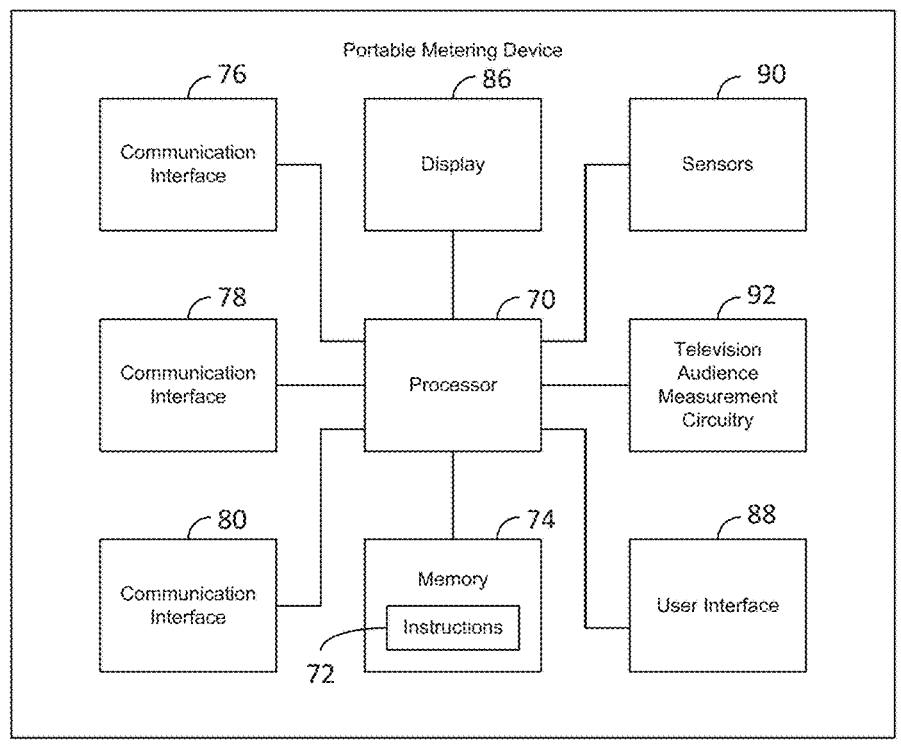
FIG. 3 is a block diagram representation of an example portable metering device.

Referring now to FIG. 3, in one embodiment, the portable metering device 22 may be equipped with a processor 70 which executes a set of instructions 72 stored in a memory 74 to control the operation of the portable metering device 22 in a manner that enables the functionality described herein. The program or the set of operating instructions 72 may be embodied in a computer-readable medium such as a programmable gate array, an application specific integrated circuit (ASIC), an erasable programmable read only memory (EPROM), a read only memory (ROM), a random access memory (RAM), a magnetic media, an optical media and/or any other suitable type of medium. Preferably, the processor 70 is capable of integer based numerical processing instead of floating point processing.

The portable metering device 22 may also include a first communication interface 76 that allows communication between the portable metering device 22 and the remotely located central data collection facility 42, a second communication interface 78 that enables the transfer of viewing data between the base metering device 20 and the portable metering device 22, a third communication interface 80 that enables the communication of identification information between the base metering device 20 and the portable metering device 22, a display 86, a user interface 88, one or more sensors 90 for detecting signals being emitted by the television 14 and any circuitry 92 necessary to perform any of the methods of television audience measurement that involve capturing and processing audio codes and/or audio signatures from an audio signal emanating from the television 14. One or more of the communication interfaces 76, 78, and 80 are optional.

As will be appreciated by persons of ordinary skill in the art, there a variety of well-known ways to configure circuitry 92 to enable television audience measurement methods that involve capture and processing of audio codes and/or audio signatures. As a result, further detail regarding such circuitry is not provided herein. In addition, the memory 74 may be supplemented with one or more storage cards (not shown) in which data may be temporarily stored, or cached, before the data being transmitted by one or more of the communication interfaces 76, 78, 80 to thereby compensate for any bandwidth limitations associated with the communication capabilities of the portable metering device 22.

The display 86 is operatively coupled to the processor 70 and may be implemented using a light emitting diode (LED) display, a liquid crystal display (LCD), or any other suitable display configured to present visual information, such as data indicating the operation of the processor 70. For example, the display 86 may indicate that the viewer 34 logged in, and/or may identify the programming content carried by the channel selected by the viewer 34 via the remote control device 16.

The user interface 88 may be used by the household member 34 to enter data and commands into the processor 70. For example, the user interface 88 may be implemented using a keyboard, a mouse, a track pad, a track ball, and/or a voice recognition system. Although the display 86 and the user interface 88 are shown as separate components, the display 86 and the user interface 88 may instead be integrated into a single component such as, but not limited to, a touch-sensitive display configured to enable interaction between the household member 34 and the portable metering device 22.

Of course, if the portable metering device 22 is implemented using a portable cellular telephone, then the portable metering device 22 will additionally include the components associated with a conventional cellular telephone. Moreover, one or more of the conventional cellular telephone components may be adapted to perform one or more of the functions performed by the processor 70, instructions 72, memory 74, and/or the first, second or third communication interfaces 76, 78, 80, such that one or more of the foregoing components may be eliminated from the portable metering device 22. Likewise, if the portable metering device 22 is implemented using a PDA or a hand-held computer, then the portable metering device 22 will additionally include the components associated with conventional PDA or hand-held computer. Moreover, one or more of the components of a conventional PDA and/or hand-held computer may be adapted to perform one or more of the functions performed by the processor 70, instructions 72, memory 74, first, second or third communication interfaces 76, 78, 80, such that one or more of the foregoing components may be eliminated from the portable metering device 22.

The portable metering device 22 may additionally include an electronic compass (not shown) configured to indicate a change of orientation by the portable metering device 22. If the electronic compass indicates no change in orientation, then the portable metering device 22 is being carried by the household member in a manner that is preventing the portable metering device 22 from communicating with the base metering device 20. To prompt the household member 34 carrying the portable metering device 22 to change the manner or position in which the portable metering device 22 is being carried, the portable metering device 22 may emit an audio signal, display a visual signal, and/or vibrate to which the household member 34 may respond by positioning the portable metering device 22 in a manner that allows communication with the base metering device 20 so that the base metering device 20 may, for example, detect the presence of the portable metering device 22 within the viewing area 30.

Alternatively, one of the sensors 62, 90 in the base metering device 20 and/or the portable metering device 22 may be implemented using a microphone coupled to a voice recognition system (not shown) installed in the metering device and trained to recognize the voice of one or more of the household members 34. When the household member 34 speaks within the sensing range of the microphone, the microphone collects the voice data. The base metering device 20 may use the voice data to identify the household member 34 who spoke as being located within the viewing area 30. The portable metering device 22 may use the voice data to verify/confirm that the household member 34 assigned to carry the portable metering device 22 is at least within a distance of the portable metering device 22 equal to the pickup range of the microphone.

One of the sensors 90 disposed in the portable metering device 22 may be adapted to sense when the portable metering device 22 is in near proximity to an operating television, i.e., a television 14 that is turned on, in accordance with the system disclosed in U.S. patent application Ser. No. 10/125,577. For example, the sensor 90 may be implemented using an audio sensor such as a condenser microphone, a piezoelectric microphone or any other suitable transducer configured to convert acoustic waves into electrical signals. Further, the sensor 90 may be configured to detect a 15.75 kilo-hertz (kHz) horizontal scan fly-back transformer sweep signal to determine whether a conventional television 14 is turned on or the sensor 90 may be configured to detect a sweep signal having a frequency of 31.50 kHz to detect whether a high-definition television (or other line-doubled television) is turned on. Upon detecting such a frequency signal, the sensor 90 provides an indication to the processor 70 which may respond to the signal by causing the circuitry 92 to collect viewing data. In the absence of an indication that the portable metering device 22 is in near proximity to an operating television 14, the portable metering device 22 may cause the circuitry 92 to stop collecting viewing data. The portable metering device 22 includes such a sensor 90 because audio codes may travel through walls and be detectable by other sensors 90 associated with the audience measurement circuitry 92 even when the portable metering device 22 is not located in the viewing area 30. Thus, the indication provided by the sensor 90 prevents the portable metering device 22 from collecting audio codes that were generated by a television 14 located in a different room than the household member 34 carrying the portable metering device 22 and that, therefore, are not associated with viewing performed by the household member 34 carrying the portable metering device 22.

Figure 4:
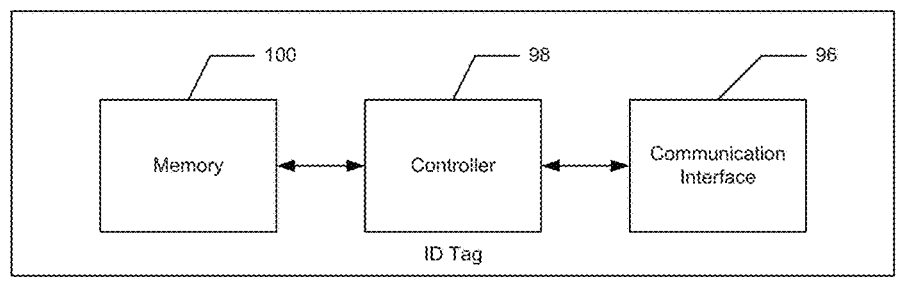
FIG. 4 is a block diagram representation of an example identification tag.

Referring now to FIG. 4, the identification tag 24 includes a communication interface 96 adapted to communicate with the third communication interface 60 disposed in the base metering device 20 and controlled by a controller 98. Further, the communication interface 96 is coupled to a storage device 100. When the identification tag 24 comes within range of the third communication interface 60 disposed in the base metering device 20, the identification tag 24 receives a signal requesting identification information from the third communication interface 60 disposed in the base metering device 20. In response to the request, the controller 98 causes an identification signal to be transmitted by the communication interface 96 to the base metering device 20. As described above, the identification signal may identify the household member 34 assigned to carry/wear the identification tag 24 and may further identify the signal as having been generated by an identification tag 24 (as opposed to a portable metering device 22). Alternatively, the identification tag 24 may be adapted to continuously or periodically generate a signal such that when the identification tag 24 comes within range of the base metering device 20, the base metering device 20 detects the signal and responds to the signal by emitting a request for identification information. Or, the signal that is continuously or periodically emitted by the identification tag 24 may include identity information such that the base metering device 20 need only receive the signal without performing a request for additional information. In one embodiment, the communication interface 96 may be adapted to transmit and receive information such that the communication interface 96 includes a receiver and a transmitter. In another embodiment, the identification tag 24 may only be adapted to transmit information and therefore the communication interface 96 may only include a transmitter. The devices used to implement the controller 98 and the storage device 100 will depend on the type of communication to be performed by the identification tag 24. Specifically, if the identification tag 24 only transmits information, the complexity of the controller 98 will be reduced. Likewise, the amount of information to be stored in the storage device 100 will affect whether a static memory or a dynamic memory is required. Regardless though, of the level of functionality embedded in the identification tag 24, any number of configurations of the controller 98 and storage device 100 may be implemented by persons of ordinary skill in the art, such that further detail regarding such configurations is not provided herein. Thus, the identification tag 24 allows the base metering device 20 to detect the presence of the household member 34 carrying/ wearing the identification tag 24 when the household member 34 comes into the communication range of the base metering device 20 which preferably extends only as far as the boundary of the viewing area 30.

Figure 5:
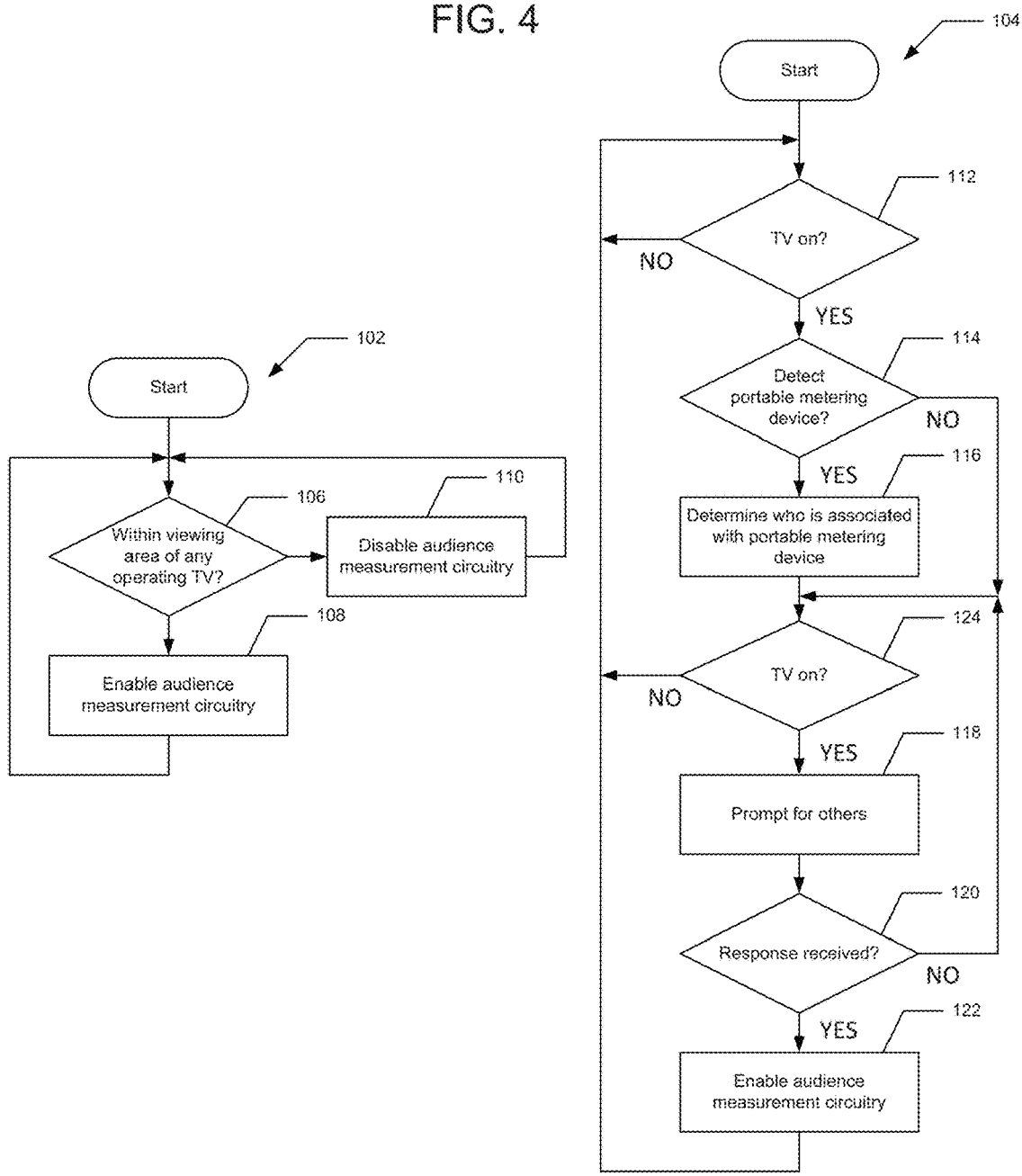
FIG. 5 is a flow diagram representation of an example method to collect audience information associated with a media presentation.

Referring now to FIGS. 1 and 5, as described above, the portable metering device 22 may be used as a primary source of viewing data and the base metering device 20 may be used as a supplemental source of viewing data. In such an embodiment, the portable metering device 22 may adapted to perform a method represented by a set of blocks 102 that may be implemented using the software instructions 72 stored in the memory 74 and executed by the processor 70. Likewise, the base metering device 20 may be adapted to perform a method represented by a set of blocks 104 that may be implemented using software instructions 52 stored in the memory 54 and executed by the processor 50. The method 102 causes the portable metering device 22 to enable the operation of the audience measurement circuitry 92 when the portable metering device 22 is within the viewing area 30 of any operating television 14 (blocks 106 and 108) regardless of whether the operating television 14 is located within the household and to disable the audience measurement circuitry 92 when the portable metering device 22 is not within the viewing area 30 of any operating television (blocks 106 and 110). When the audience measurement circuitry 92 is enabled, the portable metering device 22 collects viewing data and when the audience measurement circuitry 92 is not enabled, no viewing data is collected. Thus, according to the set of blocks 102, the portable metering device 22 collects viewing data for viewing performed via any operating television regardless of whether the viewing is associated with in-home or out-of-home viewing.

In contrast, the method 104 causes the base metering device 20 to only collect viewing data when the television 14 associated with the base metering device 20 is operating and the base metering device 20 does not detect a portable metering device 22 within the viewing area 30. The base metering device 20 detects whether the associated television 14 is operating (block 112), and if the television 14 is operating, then the base metering device 20 determines whether any signals have been detected that indicate the presence of a portable metering device 22 within the viewing area 30 (block 114). If a portable metering device 22 is detected within the viewing area 30, then the base metering device 20 determines the identity of the household member 34 associated with the detected portable metering device 22 (block 116) and then causes the people meter 28 to prompt all other household members 34 to indicate whether any of such members 34 are present in the viewing area 30 by, for example, depressing their assigned button (block 118). If one or more of the household members 34 responds to the prompt (block 120), thereby indicating that the member(s) 34 is viewing the television 14, then the base metering device 20 enables the audience measurement circuitry 64 thereby causing it to collect viewing data (block 122). The base metering device 20 may then continue to collect viewing data until there are no household members 34 located in viewing area 30 who are not carrying a portable metering device 22 or until the television is turned off. The base metering device 20 may detect the continued presence of the household members 34 in the viewing area 30 by causing the people meter 28 to continue to periodically prompt the household members 34 in accordance with any well-known people meter prompting scheme, i.e., periodically, after a channel change, etc. If, instead, no household members 34 respond to the prompt, then the base metering device 20 need not collect viewing data because the only household member 34 within the viewing area 30 is carrying a portable metering device 22 that is already collecting viewing data in accordance with the method 102. Instead, the method 102 loops back to the block 118 and continues to prompt for other household members 34 who may subsequently enter the viewing area 30, provided, of course, that the television 14 is still operating (block 124). If the television stops operating, the method 102 returns to the block 112. If at the block 114, no portable metering devices 22 are detected, then the method skips the block 116 and performs block 118 to prompt all household members. Thus, the set of blocks 104 cause the base metering device 20 to collect viewing data only if one or more household members are located within the viewing area 30 but are not carrying a portable metering device 22. As will be appreciated by persons of ordinary skill in the art, the methods 102 and 104 are performed independently; yet, allow the base metering device 20 and portable metering device 22 to be used in a complementary manner so that all in-home and out-of-home viewing is collected in a manner that is convenient to the household members 34. The methods 102 and 104 are intended for use by an embodiment of the audience measurement system 18 without identification tags 24.

The method of FIG. 5 may be modified to cause the base metering device 20 to periodically or continuously emit a signal for reception by the portable metering device 22 located within the viewing area 30. Preferably, the signal uniquely identifies the base metering device 20 that transmitted the signal. For example, the block 116 of FIG. 5 may be modified such that in addition to identifying the household members 34 associated with the portable metering devices 22 located in the viewing area 30, the base metering device 20 also emits a signal that, when detected by the portable metering devices 22 located in the viewing area 30, causes the portable metering devices 22 to identify data collected while located in the viewing area 30 as being in-home viewing data, i.e., data collected in connection with viewing that occurred in-home. The block 108 of the method 102 may be modified to cause the portable metering device 22 to identify the viewing data as in-home viewing data. Thus, the methods 102 and 104 modified as described above cause viewing data collected by the portable metering device 22 in connection with in-home viewing to be identified as such. When this data is received, the central data collection facility 42 can distinguish between viewing data collected in connection with in-home viewing and viewing data collected in connection with out-of-home viewing.

Figure 6:
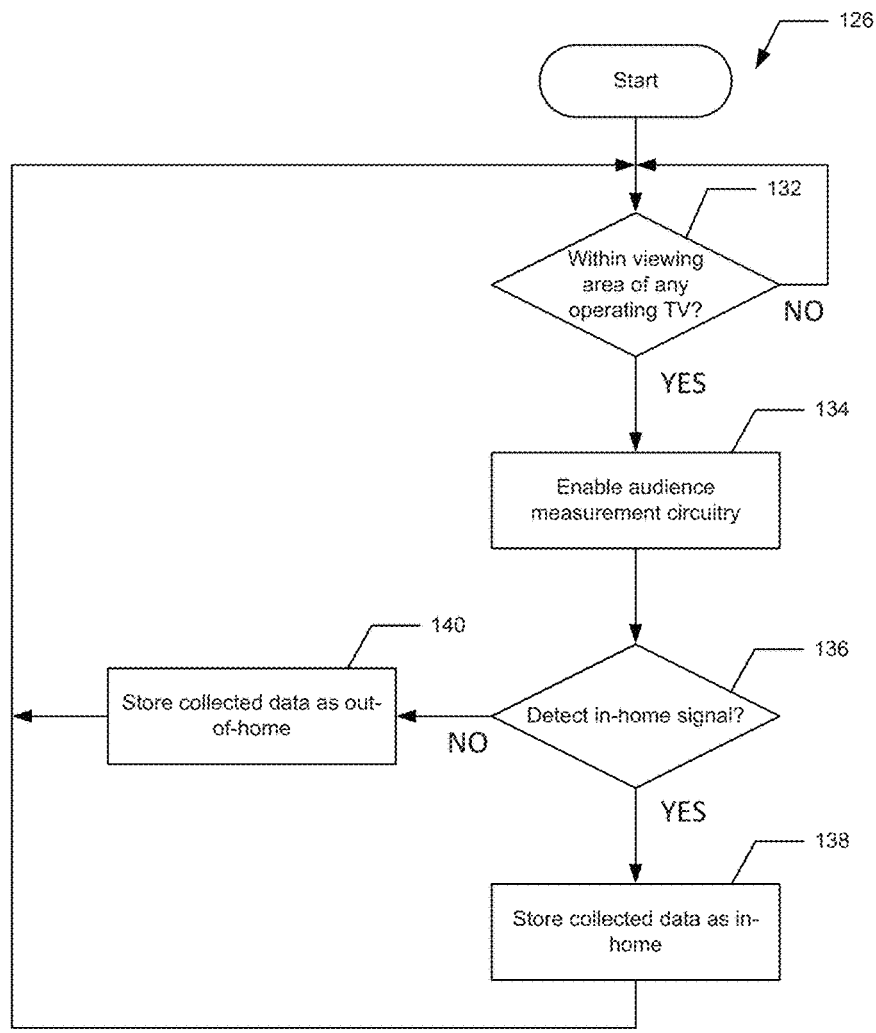
FIG. 6 is a flow diagram representation of another example method to collect audience information associated with a media presentation.
Figure 6:
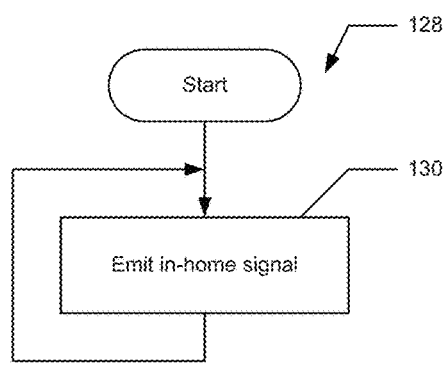

Referring now to FIG. 6, the portable metering device 22 may be used as the only source to meter viewing data and the base metering device 20 may be replaced with a signal generating device. In such an embodiment, the portable metering device 22 may adapted to perform a method represented by a set of blocks 126 that may be implemented using the software instructions 72 stored in the memory 74 and executed by the processor 70. Likewise, the modified base metering device 20 may be adapted to perform a method represented by a set of blocks 128 that may be implemented using the software instructions 52 stored in the memory 54 and executed by the processor 50. The method 128 may begin at a block 130 at which the modified base metering device 20 continuously or periodically emits a signal for reception by any portable metering devices 22 located within the viewing area 30 of the television 14. In another embodiment, the modified base metering device 20 may be adapted to only emit the in-home viewing signal in response to sensing one or more portable metering devices 22 within the viewing area 30. Of course, in this embodiment, the modified base metering device 20 will include signal sensing capabilities as well as signal generating capabilities. As will be appreciated by persons of ordinary skill in the art, either of these embodiments of the modified base metering device 20 need not include a processor and instructions but may instead be implemented using, for example, a signal transmitter and receiver and a data register for holding data that uniquely identifies the modified base metering device 20 and simple logic circuitry that causes the device to operate according to the method 128.

The method 126 may begin at a block 132 at which the portable metering device 22 determines whether it is located within the viewing area 30 of an operating television. This may be performed using, for example, information supplied by one of the sensors 90 adapted to sense a frequency signal produced by a flyback transformer associated with the television as described above. If the portable metering device 22 is located within the viewing area of an operating television, then the audience measurement circuitry 92 is enabled and begins collecting viewing data (block 134). In addition to enabling the audience measurement circuitry 92, the portable metering device 22 determines whether a signal generated by the modified base metering device 20 has been detected, thereby indicating that the portable metering device 22 is located within a viewing area 30 located in the home 32. If the signal is detected, the viewing data collected by the portable metering device 22 is identified as in-home viewing data (block 138). If no such signal is detected, then the viewing data collected by the portable metering device 22 is identified as out-of-home viewing data (block 140).

Figure 7:
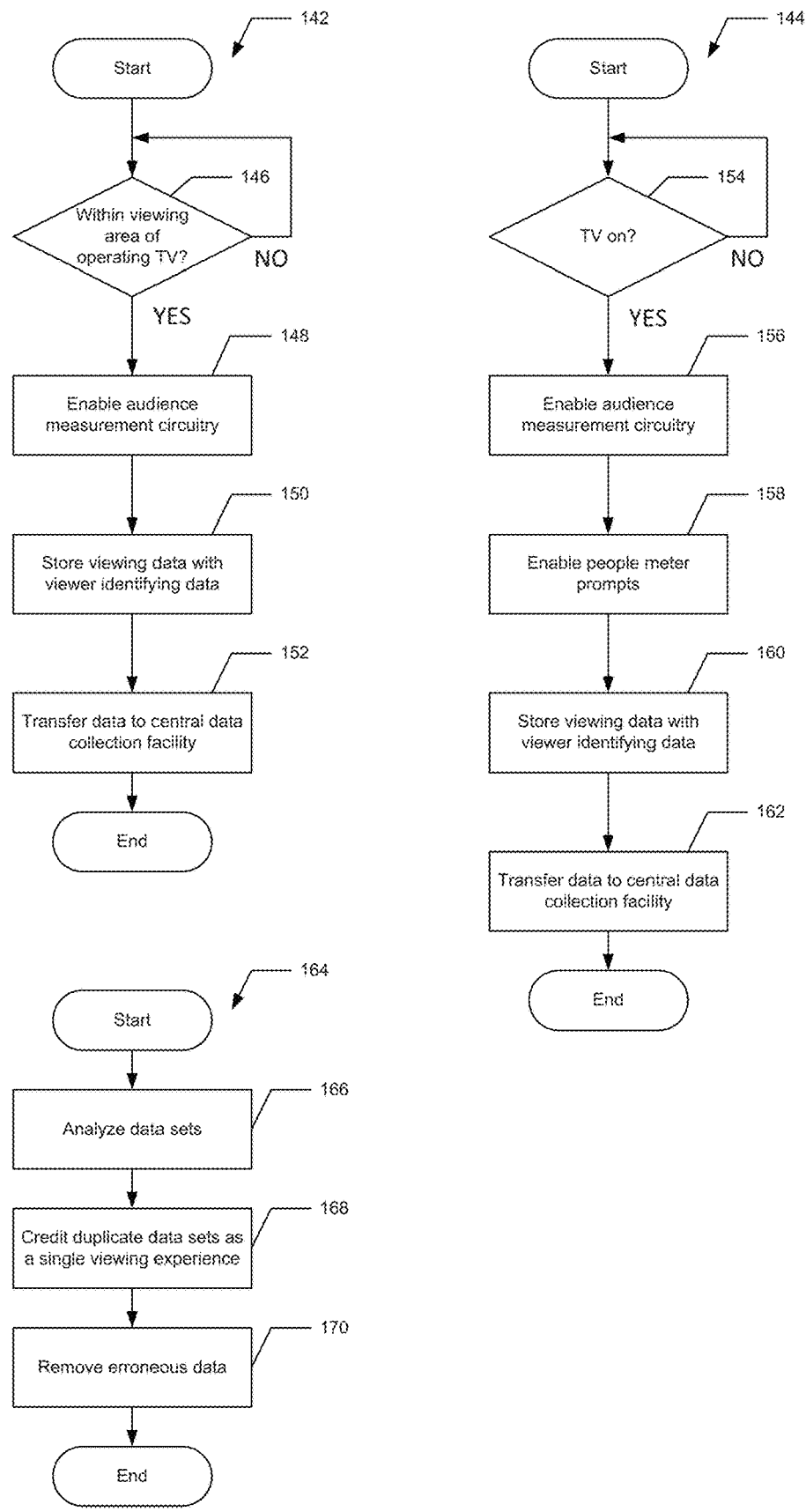
FIG. 7 is a flow diagram representation of another example method to collect audience information associated with a media presentation.

In another embodiment, the audience measurement system 18 may include a base metering device 20 adapted to collect viewing data for all in-home viewing and a portable metering device 22 adapted to collect viewing data for all in-home viewing and all out-of-home viewing. In such an embodiment, the portable metering device 22 may be adapted to perform a method represented by a set of blocks 142 that may be implemented using software instructions 72 stored in the memory 74 and executed by the processor 70. Likewise, the base metering device 20 may be adapted to perform a method represented by a set of blocks 144 that may be implemented using software instructions 52 stored in the memory 54 and executed by the processor 50. According to the method 142 shown in FIG. 7, the portable metering device 22 collects viewing data whenever the portable metering device 22 is within the viewing area 30 of an operating television 14 (blocks 146, 148). Using the method 144, the base metering device 20 collects viewing data whenever the television 14 associated with the base metering device 20 is operating (blocks 156, 160). In addition, the base metering device 20 causes the people meter 28 to perform any of a variety of prompting methods for causing the household members 34 to provide information about their identities and about whether the household members 34 are located within the viewing area 30 (block 158). The sets of viewing data collected by the portable metering device 22 and the base metering device 20 are both transported to the central data collection facility 42 via any of the communication interfaces 56, 76 adapted to enable communication with the central data collection facility 42 (blocks 152, 162). At the central data collection facility 42, the set of viewing data provided by the portable metering device 22 and the set of viewing data provided by the portable metering device 22 are compared and identified as being associated with a single viewing event performed by a single person (blocks 166, 168). The data sets may also be compared to identify possible errors in the data (block 170).

Alternatively, the methods 144 described above, may be performed such that instead of the base metering device 20 causing the people meter 28 device to prompt household members 34 for information, the method 144 may rely upon signals provided by the identification tags 24 carried by the household members 34 located in the viewing area to identify the household members 34. In such an embodiment, the base metering device 20 receives information from all of the identification tags 24 located in the viewing area 30. That information is then stored by the base metering device 20 and used by the base metering device 20 to associate the collected viewing data with the appropriate household member(s).

Figure 8:
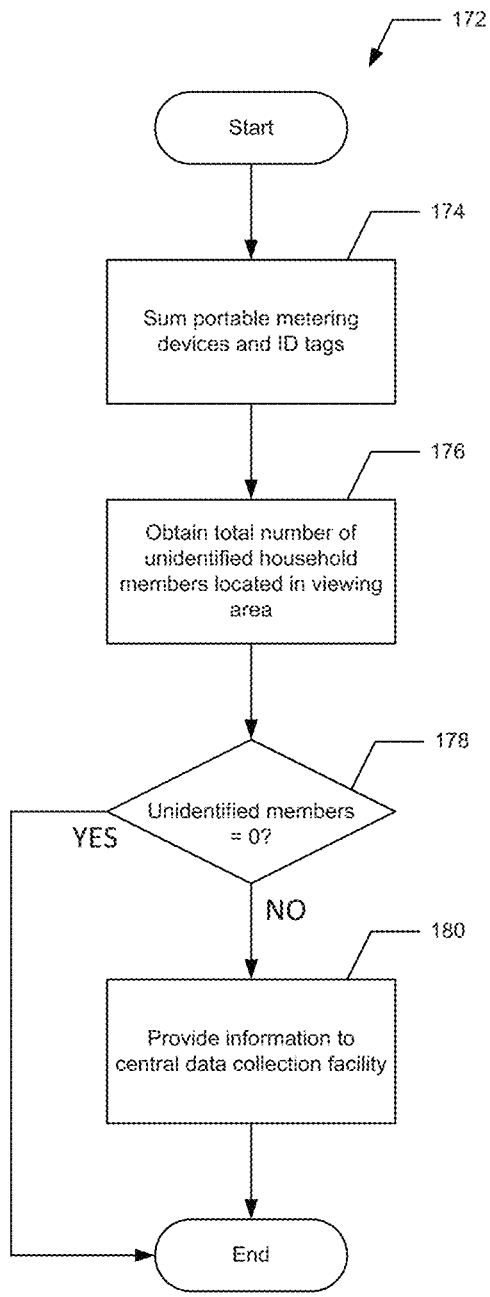
FIG. 8 is a flow diagram representation of another example method to collect audience information associated with a media presentation.

Referring now to FIG. 8, the base metering device 20 may be adapted to determine when one or more household members are located in the viewing area 30 but are not carrying either a portable metering device 22 or an identification tag 24. Prior to performing the method, the base metering device 20 obtains a signal from the audience change detector 26 from which the base metering device 20 determines the number of household members 34 located in the viewing area 30. In addition, the base metering device 20 detects the number of portable metering devices 22 and the number of identification tags 24 located in the viewing area 30. This information, once obtained by the base metering device 20, is used as input for a method 172 that may begin at a block 174 at which the base metering device 20 adds the total number of portable metering devices 22 located in the viewing area 30 to the total number of identification tags 24 located in the viewing area 30 to obtain a total number of identified household members located in the viewing area (block 174). The total number of identified household members located in the viewing area 30 is then subtracted from the number of household members located in the viewing area 30 as determined from the information provided by the audience change detector 26 thereby resulting in a total number of unidentified household members located in the viewing area (block 176). If the total number of unidentified household members is equal to zero, determined at a block 178, then the base metering device 20 need not perform any additional processing related to determining viewer identities as all viewer identities are known from the signals received by the base metering device 20, the portable metering devices 22 and the identification tags 24. If, instead, the total number of unidentified household members is greater than zero, then the base metering device 20 may be adapted to inform the central data collection facility 42 of the number of unidentified household members located in the viewing area 30, the time during which the unidentified household members were located in the viewing area 30, the programming that was displayed by the television 14 during the aforementioned time, and the identities of any household members not included among a list of household members identified by one of the identification signals received by the base metering device 20 from one of the portable metering devices 22 and/or identification tags 24 by located in the viewing area 30 (block 180).

In a further embodiment, the base and portable metering devices 20, 22 may be configured to provide interactive feedback collected from a viewer of the media presentation to the central data collection facility 42. For example, a product and/or service company may provide polling queries associated with an advertisement for that product and/or service company to the central data collection facility 42 which in turn, may communicate the polling queries to the metering device (i.e., the base metering device 20 and/or the portable metering device 22). The product and/or service company may upload the polling queries to the central network via the Internet and/or any other suitable connection. In response to detection of the source identifier (SID) associated with the product and/or service company, the metering device may generate polling queries on the display. Information provided to the central data collection facility 42 by the metering device may include responses of the viewer to queries generated by the metering device information used by the viewer to change the settings of the metering device, or expressions of like or dislike of a media presentation that the viewer is consuming in response to polling queries from the source of the media presentation. That is, a viewer of a television program may provide an opinion regarding the content of the television program. As a result, the metering device may transmit information associated with the viewer and the media presentation, and interactive feedback by the viewer associated with the media presentation to the central data collection facility 42 for processing such data.

Figure 9:
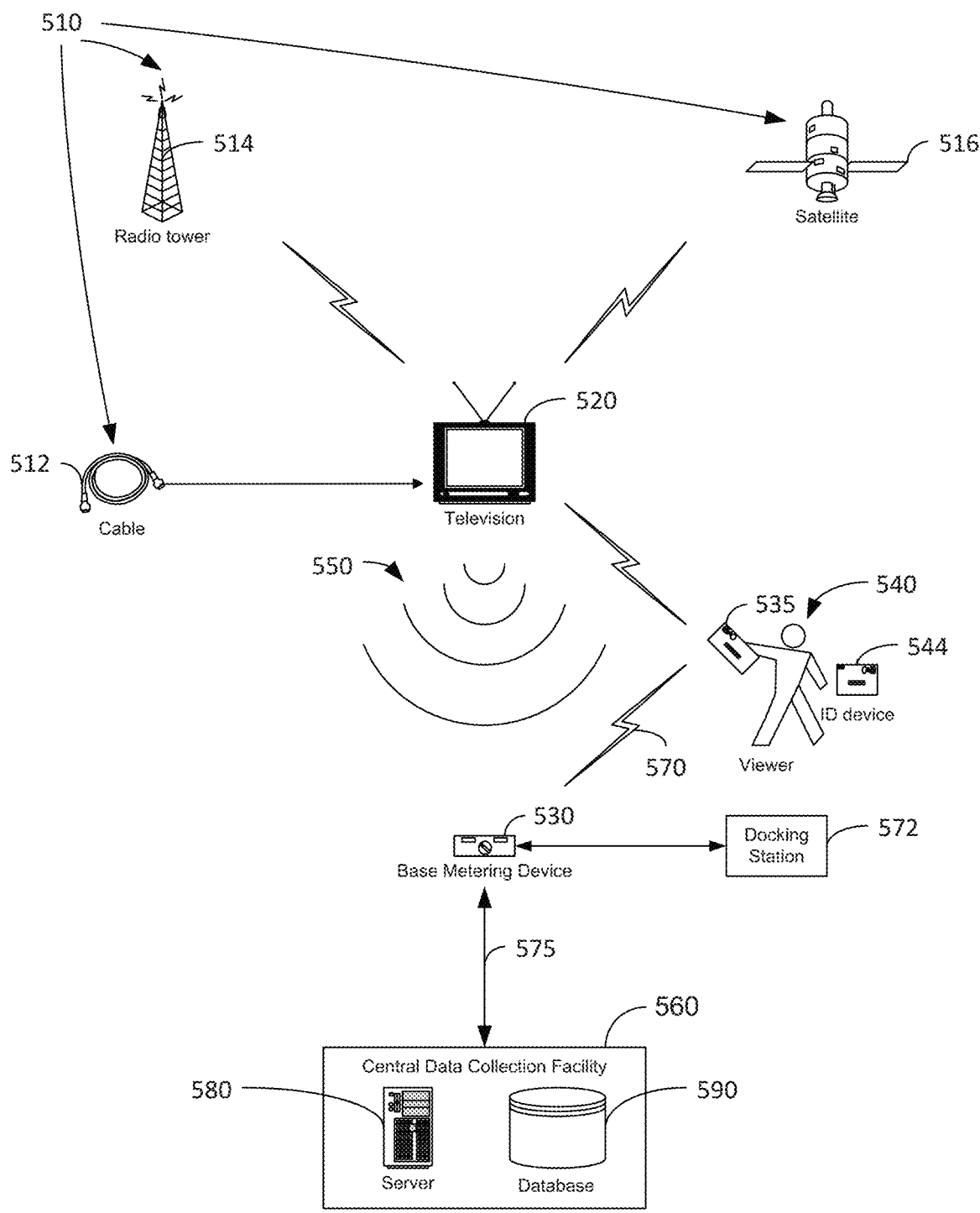
FIG. 9 is a block diagram representation of another example television system.

Referring to FIG. 9, the metering devices described above may operate in conjunction with each other to collect audience information associated with a media presentation. The example television system 500 of FIG. 9 includes a television provider 510, a television 520, a base metering device 530, and a portable metering device 535. The television service provider 510 may be any television service provider such as, but not limited to, a cable television service provider 512, a radio frequency (RF) television provider 514, and/or a satellite television service provider 516. The television 520 may be any suitable television configured to emit an audio component and a video component of a media presentation such as, but not limited to, a program, an advertisement, a video game, and/or a movie preview. The base metering device 530 may be the metering device 20 shown in FIG. 2, and the portable metering device 535 may be the metering device 22 shown in FIG. 3 (i.e., one of the cellular telephone, the PDA, or the handheld computer). The base metering device 530 and the portable metering device 535 may be in communication with each other via a first communication link 570 such as a hardwire link and/or a wireless link. For example, a docking station 572 may be configured to hold and communicatively couple the portable metering device 535 to the base metering device 530 via a universal serial bus (USB) port. Accordingly, the base metering device 530 and the portable metering device 535 may be in communication with each other. Further, the base metering device 530 may be in communication with a central data collection facility 560 via a second communication link 575 such as a hardwire link and/or a wireless link. The central data collection facility 560 may include a server 580 and a database 590.

Figure 10:
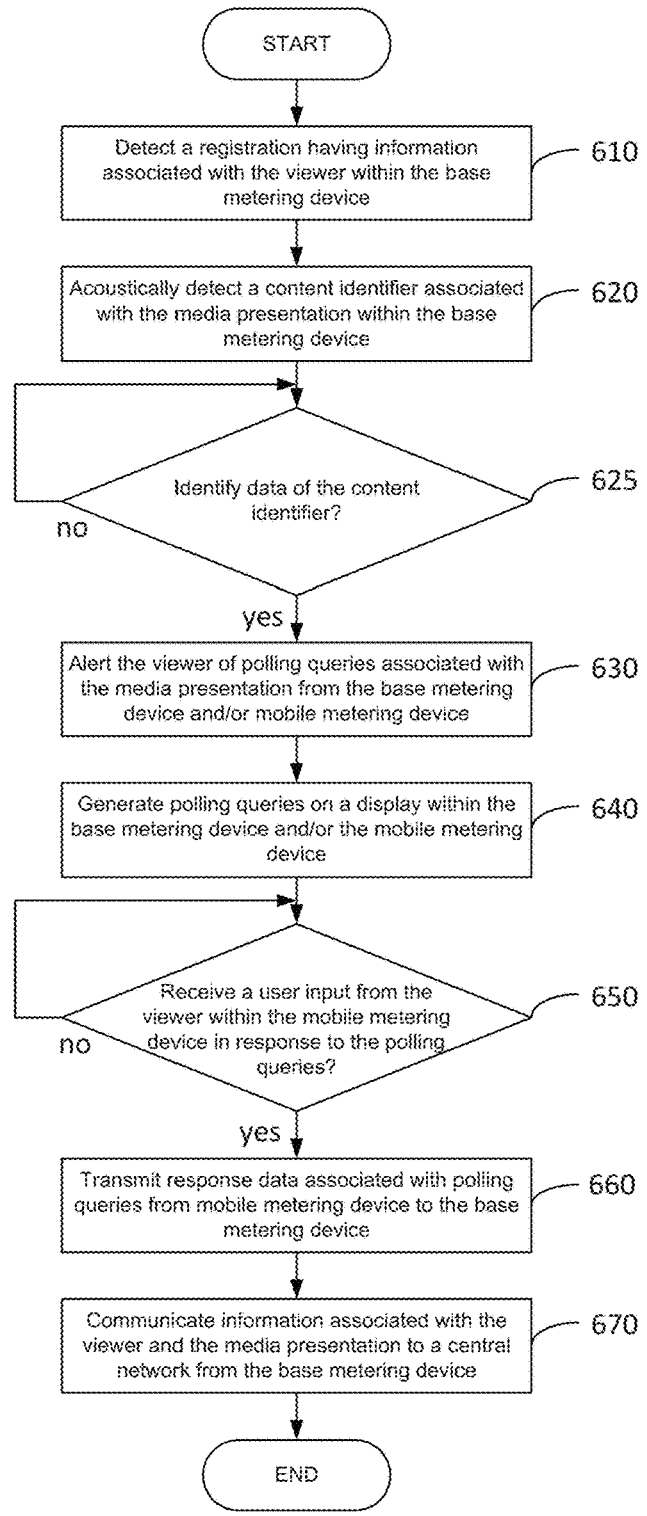
FIG. 10 is a flow diagram representation of an alternative set of machine readable instructions which may be executed to collect audience information associated with a media presentation.

Example machine readable instructions which may be executed by the base metering device 530 and the portable metering device 535 are represented in a flow chart in FIG. 10. In the illustrated example, the base metering device 530 first detects a registration including information associated with a viewer 540 from the portable metering device 535, a tuning device or a remote control device (e.g., one shown as 16 in FIG. 1), and/or an optional identification device 544 (e.g., an ID tag or a cellular telephone) (block 610). For example, the viewer 540 may manually register with the base metering device 530 using either the portable metering device 535 or the tuning device. Alternatively, the viewer 540 may automatically register with the metering device 535 via the identification device 544.

Upon receiving the registration, the base metering device 530 attempts to detect a content identifier 550 associated with a media presentation as described above (block 620) and identify the content identifier 550 (block 625). After a content identifier is detected and identified, the base metering device 530 and/or the portable metering device 535 alerts the viewer 540 to respond to polling queries (block 630). For example, the base metering device 530 and/or the portable metering device 535 may draw the attention of the viewer 540 with an audio alert, a visual alert, and/or a vibrational alert. The visual alert may be an LED that is green, red, blue, or any other suitable color. The visual alert may also be any suitable device that produces a visual signal to draw the attention of the viewer 540. The audio alert may be a piezoelectric device, a speaker, or any other suitable device that generates an audible signal to draw the attention of the viewer 540. The vibrational alert may be embodied in any well-known vibration devices such as those used in conventional cellular telephones and/or pagers. The base metering device 530 and/or the portable metering device 535 may use any or all of the visual alert, audio alert, and vibrational alert to draw the attention of the viewer 540. When a media presentation requires a consumer interaction, for example, the base metering device 530 and/or the portable metering device 535 may prompt the viewer 540 to disconnect the portable metering device 535 from the docking station 572. The viewer 540 may then remove the portable metering device 535 from the docking station 572 to respond to the polling queries. Accordingly, the base metering device 530 and/or the portable metering device 535 generates the polling queries on a display disposed in or otherwise associated with the base metering device 530 and/or the portable metering device 535 (block 640). The portable metering device 535 may receive an input via a user interface (e.g., one shown as 88 in FIG. 3) in response to the polling queries (block 650).

The portable metering device 535 transmits response data associated with the polling queries by the viewer 540 to the base metering device 530 via the second communication link 575 (block 660). After receipt of the response data, the base metering device 530 communicates information associated with the viewer and the media presentation to a central data collection facility 560 for collecting such data via the first communication link 570 (block 670).

Figure 11:
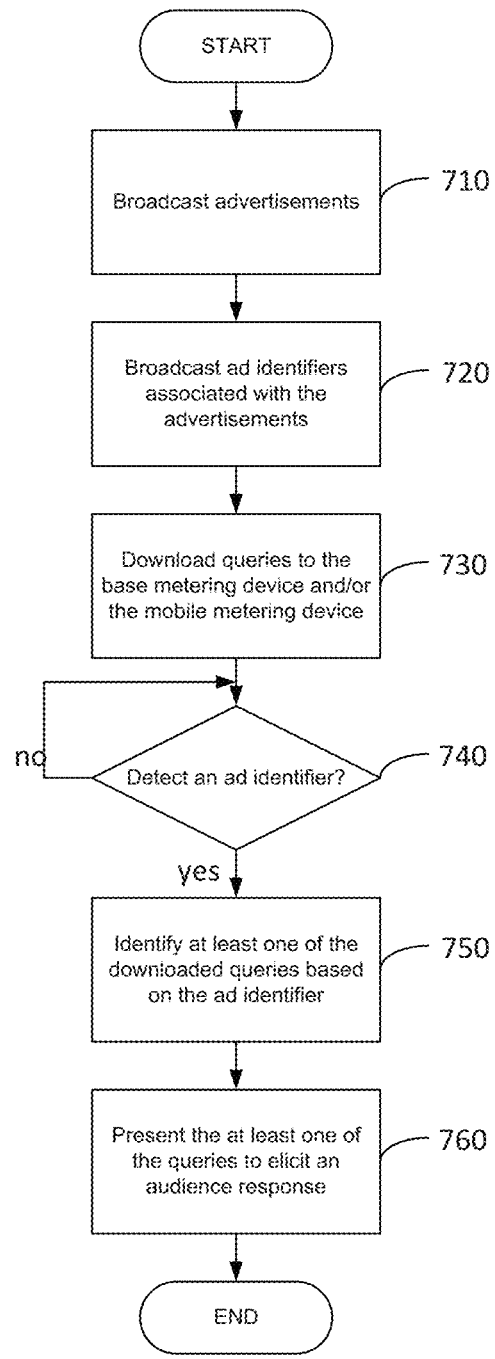
FIG. 11 is a flow diagram representation of an alternative set of machine readable instructions which may be executed to collect audience information associated with a media presentation.

Another set of example machine readable instructions which may be executed by the base metering device 530 and the portable metering device 535 are represented in a flow chart in FIG. 11. In the illustrated example, the television 520 broadcasts advertisements of a product and/or a service company, an organization, and/or any other entities to a consumer (block 710). The television 520 also broadcasts an ad identifier such as the SID described above with each advertisement (block 720). For the example, a soft drink company may embed a corresponding SID in an advertisement for a soft drink produced by the company. Further, the company may upload queries such as, but not limited to, survey questions associated with the advertisement to the central data collection facility 560 via the Internet. Then, the ad identifier and the queries are downloaded to the base metering device 530 and/or the portable metering device 535 (block 730). Alternatively, the base metering device 530 and/or the portable metering device 535 may retrieve such data from the central data collection facility 560. The base metering device 530 attempts to detect the ad identifier (block 740). Based on the ad identifier, the base metering device 530 and/or the portable metering device 535 identifies at least one survey question associated with the advertisement (block 750), and presents the at least one survey question to the consumer (block 760). Of course, in this embodiment, the base metering device 530 and/or portable metering device 535 are programmed with information that the respective metering device uses to associate the ad identifier with the appropriate survey question(s). Such information may be provided, for example, in a database format. Further, the base metering device 530 may be adapted to receive the database 590 from the central data collection facility 560 and to transmit the database 590 to the portable metering device 535 via the docking station 572 or via a wireless communication link using one or more of the appropriate communication interfaces installed in each device.

The foregoing has described various configurations in which portable metering device(s) may be used in conjunction with optional base metering device(s). While such base metering devices may have the configurations described above, one or more portable metering devices may be configured to operate as base metering devices. For example, portable metering devices, such as may be implemented by cellular telephones, PDAs, and the like, may be programmed to operate as base metering devices that, while portable, remain in a home, business, or any other location in which a previously-described base metering device may be located. Using portable metering devices to implement base metering devices is advantageous because portable metering devices are compact and easily shipped to panelist homes. Additionally, due to their small form factors, the portable metering devices may be easily placed at a location near, for example, a primary television that is viewed in the household.

To implement a base metering device with a portable metering device, a panelist would be instructed to power the device from a sustainable power supply, such as a wall outlet, via a transformer. The panelist could also be instructed as to the physical placement of the device to ensure proper reception of the signals used to measure media exposure. For example, the panelist may be instructed to locate the device to receive audio from a television set. Either before or after the device is placed, the panelist would be instructed to activate the device.

Activation of the portable metering device may include the execution of various routines that may include media monitoring routines that were previously downloaded. Alternatively, prior to first use of the device as a base metering device, device activation may include downloading software/firmware to implement metering functionality. As described below in detail, the downloading of software/firmware may include, but is not limited to, downloading software via wired or wireless network. Additionally, downloading may involve downloading the desired software to an intermediate device, such as a personal computer, and subsequently porting the software to the portable metering device via a wired (universal serial bus, parallel bus, and/or Ethernet) or wireless connection (e.g., Bluetooth, 802.11x, etc.). In addition to the ease with which software/firmware may be downloaded (either directly or indirectly) to the portable metering device, software upgrades, patches, and/or fixes may also be downloaded to the portable metering device.

After the portable metering device is placed, activated, and outfitted with metering software, the portable metering device may emit an audible tone and/or a vibration and/or a visual alert, etc. to indicate that the portable metering device is receiving valid audio codes from, for example, a television proximate the location in which the portable metering device is placed. Such indications, which provide the panelist feedback confirming receipt of audio codes, indicate that the portable metering device is properly placed with respect to the television (or other media device) being monitored.

As noted above, portable metering devices may be configured for use as base metering devices to provide base metering functionality in a small, easily distributable, easily locatable package of a portable metering device. As part of the process of configuring a portable metering device for use as a base metering device, the panelist downloads software or firmware to the portable metering device. In addition to the metering functionality provided by the firmware/software, the firmware/software may disable the earpiece speaker of the portable metering device to prevent audio feedback that may corrupt data acquisition of the device. Additionally, the firmware/software may enable a high gain mode of the microphone to enable speakerphone-like microphone properties, rather than normal, directional mode microphones conventionally used with devices such as cellular telephones.

Many devices that may be configured to operate as portable metering devices used as a base metering devices include an interface (input/output (I/O) port) through which data may be passed. For example, cellular telephones include base plug I/O ports through which data may be serially passed to provide programming information to the cellular telephone. Additionally, devices such as PDAs likewise include such interfaces. In one example, the software/firmware downloaded to the portable metering devices may configure the I/O ports in the portable metering device to accept metering data directly. For example, a cellular telephone may be configured to accept incoming "raw" pulse coded modulation (PCM) data through the I/O port and provide the same to the metering software/firmware, thereby providing a hardwired alternative to wireless audio detection via microphone.

Figure 12:
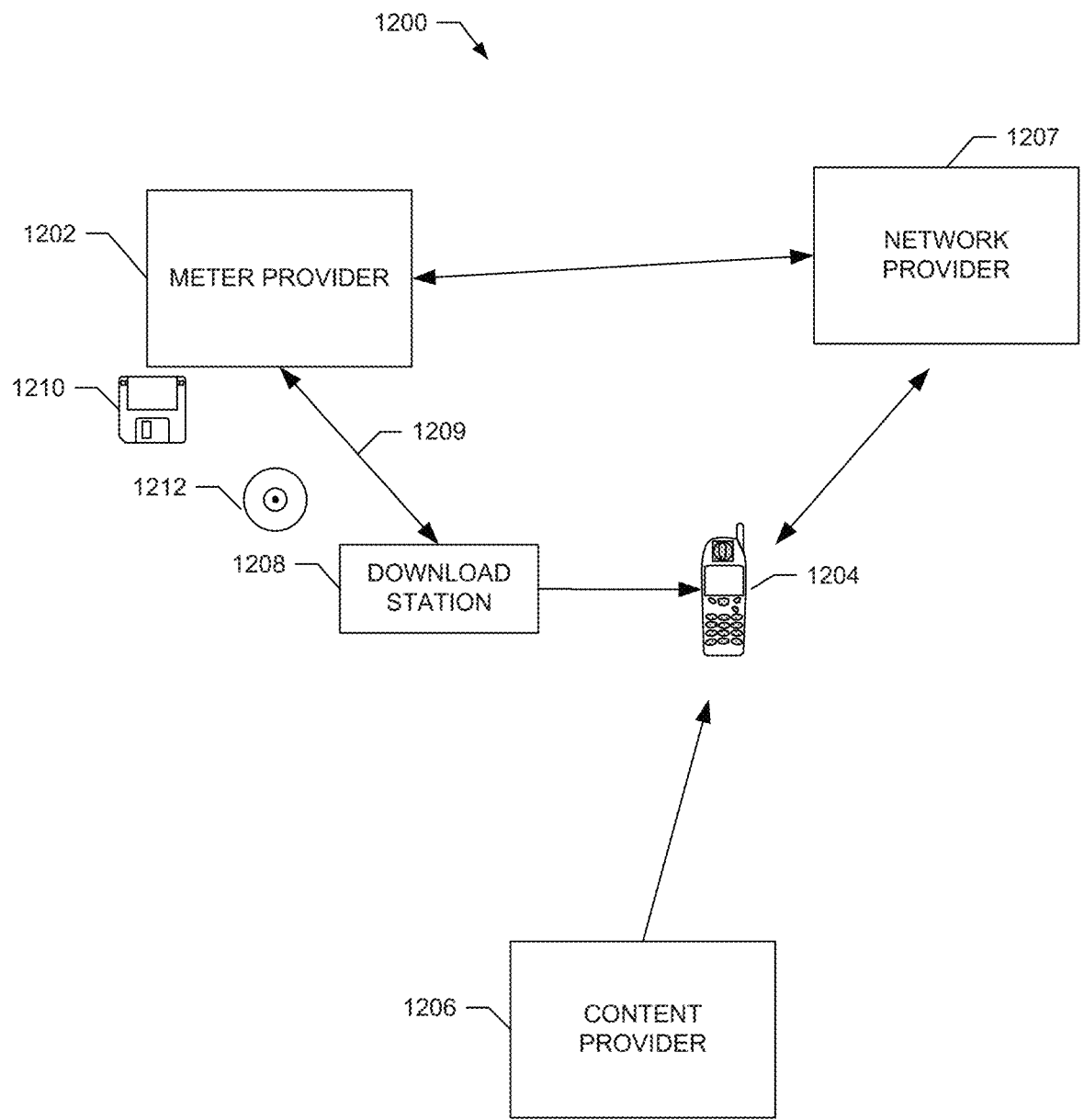
FIG. 12 is a block diagram of a metering system.

As shown in FIG. 12, generally, a metering system 1200 may include a meter provider 1202, a portable unit 1204, and a content provider 1206. As further shown in FIG. 12, the metering system 1200 may include a network provider 1207 to provide wireless network access to the portable unit 1204 and/or a download station 1208 that is coupled to the portable unit 1204. In general, the meter provider 1202 imparts metering functionality to the portable unit 1204, which, as described below, may be implemented using a cellular telephone, a personal digital assistant (PDA), a pager, or any other portable device. The portable unit 1204 is then able to meter information provided by the content provider. As will be readily appreciated by those having ordinary skill in the art, the information provided by the content provider may be television and/or radio signals and/or signals provided over any other communication network, such as the Internet. More generally, the information may be audio, video, or data information. For example, audio codes embedded in television programming may be generated by a television when the television processes the programming. Such codes may be captured by the portable unit 1204. Alternatively, the portable unit 1204 itself may be used to tune and view television programming, as well as have the ability to monitor the television programming being tuned.

The metering provider 1202 may be, for example, a website hosted by an information gathering service, such as Nielsen Media Research or any other like service. A service associated with the metering provider 1202 contacts a potential panelist, such as the owner of the portable unit 1204. The service may utilize the network provider 1207 to send a request to the potential panelist to join the panel and receive a corresponding response in which the potential panelist may accept for reject the request. If the potential panelist opts to join the panel, then the network provider 1207, as described below, may automatically download the appropriate metering software from, for example, a website hosted by the meter provider 1202 to the portable unit 1204 (e.g., "push"). Alternatively, the network provider 1207 may provide, for example, a software download menu option by which the panelist, as described below, may use the portable unit 1204 to request that the metering software be loaded onto and executed by the portable unit 1204 (e.g., "pull").

As noted above, the portable unit 1204 may be implemented using a PDA, a cellular telephone, a pager, or any other known device. This device may already be owned by the panelist or may be provided to the panelist. If provided, the panelist may or may not be allowed to use the device for its originally intended purpose as well as having it perform the metering function. As described above, the portable unit 1204 includes memory and or memories into which metering software may be written. The behavior of the portable unit 1204 may then be modified through the execution of the metering software so that in addition to the conventional functionality of the portable unit 1204 (e.g., PDA features, telephone call processing, page reception, and the like), the portable unit 1204 will include content metering functionality including signature and/or code processing, prompting the audience member for a variety of purposes including: 1) Are you actively watching TV (or any source of measured content) or just near it? 2) What is your subjective positive/negative response to the content to which you were just exposed? 3) What is your reaction positive/negative to the brand to which you were just exposed? etc. All of these prompts are optional and may or may not be included in the metering software.

As shown in FIG. 12, the metering software may be provided directly to the portable unit 1204 via the network provider 1207. In the alternative, the metering software may be transferred to the download station 1208, which may be implemented using a standard personal computer or other device able to display and/or receive information over a network connection 1209. In such an arrangement, the metering software may be transferred from the meter provider 1202 to the download station 1208 via an Internet connection 1209. As a further alternative, the panelist may use the portable unit 1204 to request distribution of the metering software on media, such as a diskette 1210 or a compact disk 1212. The panelist would, upon receipt of the media, use the download station 1208 to transfer the metering software to the portable unit 1204. The process of transferring the metering software to the portable unit 1204 may be performed using a hardwired (e.g., USB) connection. Alternatively, the transfer process may be performed in a similar manner to the way in which ring tones or other features may be downloaded to cellular telephones.

Figure 13:
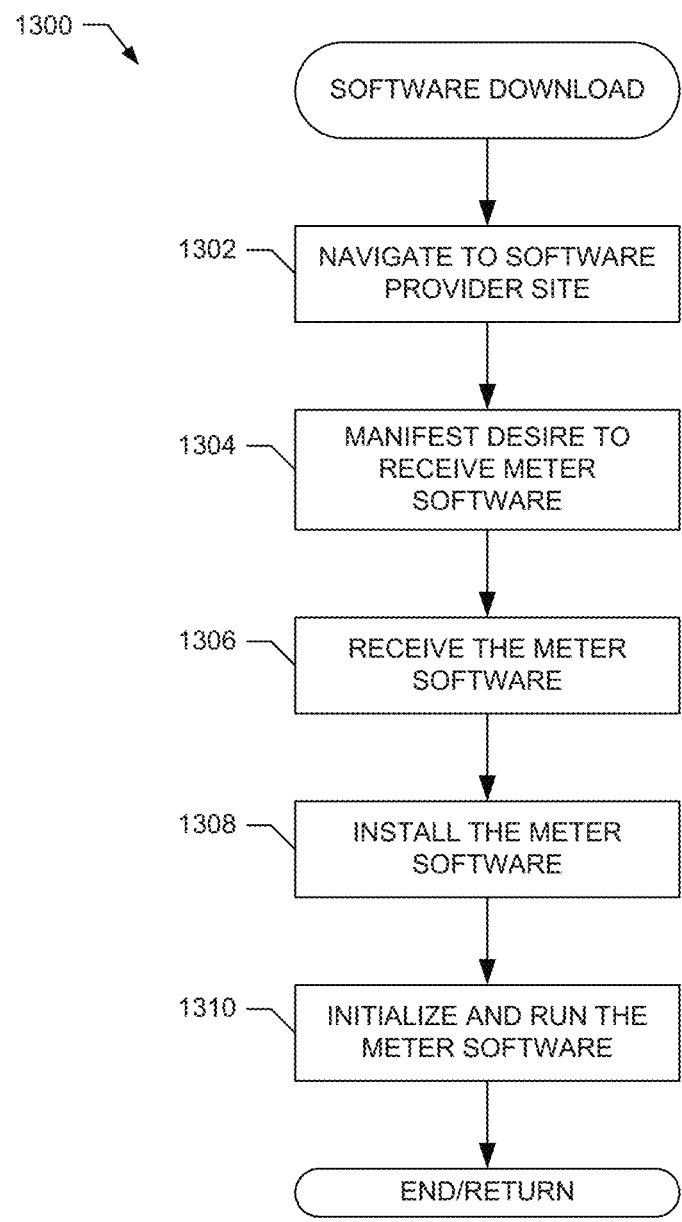
FIG. 13 is a flow diagram of an example software download process.

A software download process 1300, which may be carried out by the portable unit 1204 or the download station 1208 to obtain software to execute metering functionality is shown in FIG. 13. To obtain metering software, the panelist navigates to the software provider site (block 1302) and manifests a desire to receive metering software (block 1304). As will be readily appreciated by those having ordinary skill in the art, the manifestation of the desire to receive metering software may include logging into the software provider site, entering a code given by the meter provider 1202 to the panelist, or any other manifestation. In addition, the panelist may provide various other pieces of information to the meter provider 1202. For example, a panelist may provide demographic information, portable unit 1204 specifications, panelist name and address, etc. In addition, the panelist may be actively recruited via phone call, email, or other method of actively contacting them. Alternatively, the panelist may volunteer at a web site, physical location, etc.

After the panelist has manifest a desire (or ascent) to receive the meter software (block 1304), the panelist receives the meter software (block 1306). For example, the panelist may download the meter software directly to the portable unit 1204 or may download the meter software to the download station 1208 for later uploading to the portable unit 1204. As a further alternative, the meter provider 1202 may ship media (e.g., the diskette 1210 or the compact disk 1212) to the panelist who would then input the same to the download station 1208.

Upon receipt of the metering software (block 1306), the panelist installs the same into the portable unit 1204 (block 1308). For example, if the software was downloaded to the portable unit 1204, the panelist may command the portable unit 1204 to commence software installation. Alternatively, the panelist may use the download station 1208 to install the metering software onto the portable unit 1204. Installation and/or activation of the metering software may occur automatically after downloading it.

After the meter software has been received (block 1306) and installed (block 1308), the metering software is initialized and run by the portable unit 1204 (block 1310). After installation, the metering software may prompt the panelist to enter demographic information. Additionally, once operational, the metering software enables the portable unit 1204 to perform metering functions in addition to the conventional functions associated with the portable unit 1204. The metering software may run for a limited period of time and then automatically uninstall itself, once the cooperation of this specific panelist is no longer required. Alternatively, uninstallation may need to be done manually by the panelist when cooperation is no longer required or when they wish to no longer be a panelist.

Figure 14:
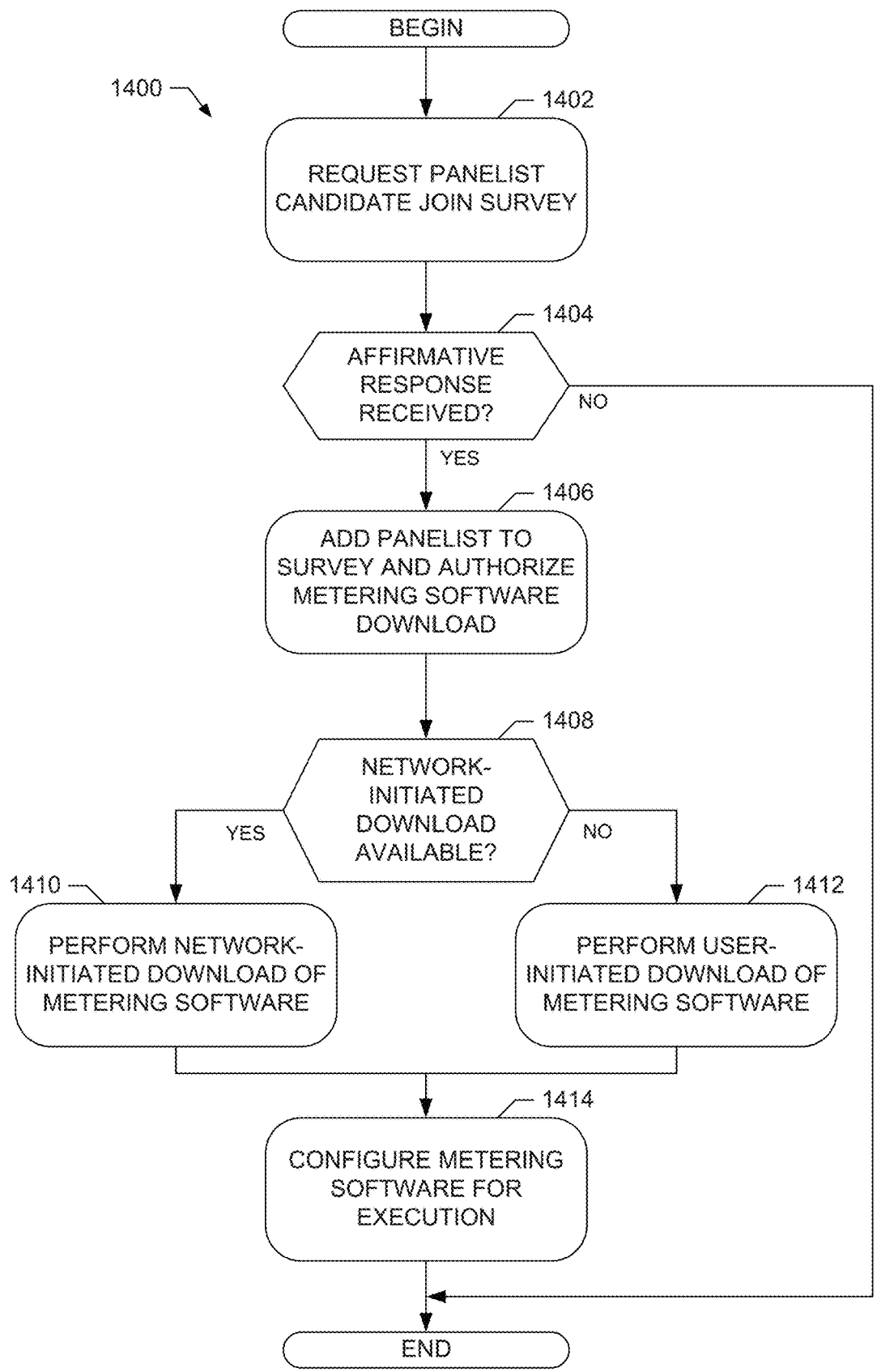
FIGS. 14 through 21 are flow diagrams of example processes to contact a potential panelist, download metering software to a portable device used by the panelist, and configure the metering software for execution to implement a portable meter.

As noted previously, an example process 1400 to contact a potential panelist, download metering software to a portable device (e.g., the portable unit 1204) used by the panelist and configure the metering software for execution on the portable device is shown in FIG. 14. The example process 1400 may be carried out by the metering provider 1202, the portable unit 1204, and/or the network provider 1207 of FIG. 12 and may be executed on a periodic basis, when a new audience measurement study is commissioned, to fulfill a vacancy in an existing audience measurement study, etc. The example process 1400 begins by contacting a panelist candidate and requesting that the candidate participate in an audience measurement study (block 1402). As discussed below in connection with FIG. 15, the panelist candidate may be contacted via a phone call, a text message, etc. and the candidate may respond to the request also via a phone call, a text message, etc.

Figure 16:
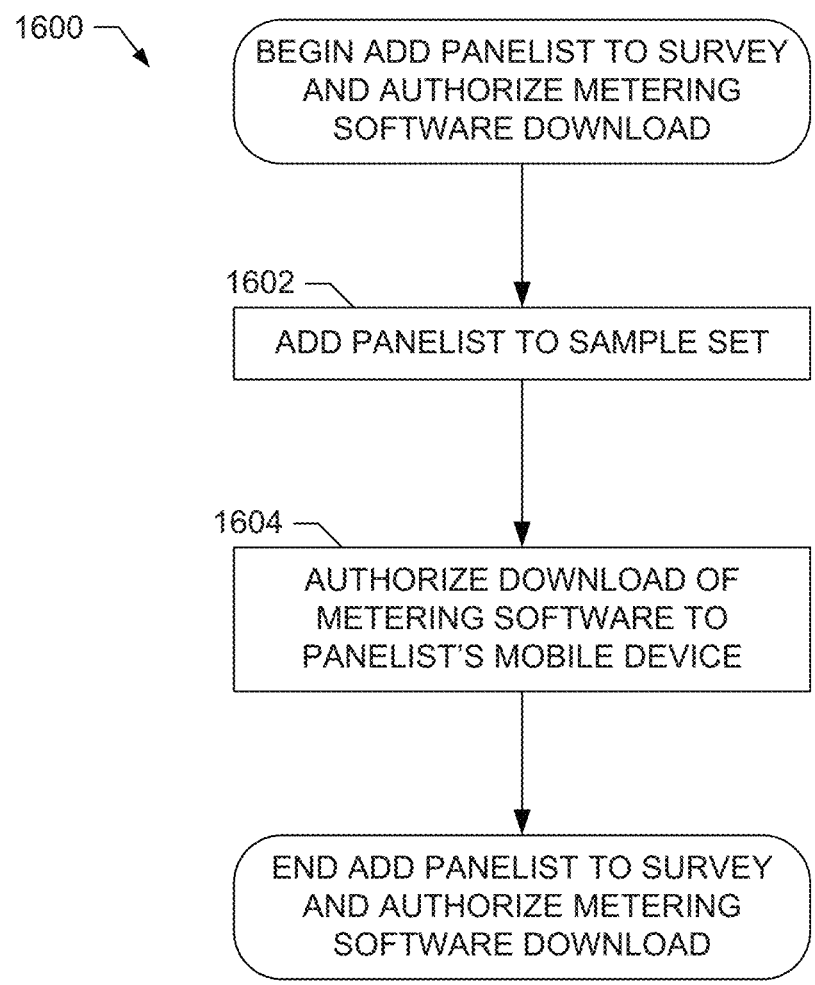

The process 1400 then determines whether an affirmative response was received from the panelist candidate (block 1404). If an affirmative response is not received (e.g., if the panelist does not respond or sends/provides a negative response declining to participate in the study) (block 1404), then the process 1400 ends. If, however, an affirmative response is received (block 1404), then the process 1400 adds the panelist to the study and authorizes the download of the appropriate metering software to the portable unit 1204 corresponding to the new panelist (block 1406). This may include noting a telephone number or an Internet Protocol (IP) address of the portable unit used by the panelist. An example process to implement the functionality of block 1406 is shown in FIG. 16 and discussed in greater detail below. The process 1400 then determines whether network-initiated download of the metering software to the portable unit 1204 is available and supported by the portable unit 1204 and the network provider 1207 (block 1408). In some circumstances, network-initiated software download may be preferred over user-initiated software download, for example, to minimize the amount of panelist effort required to download and configure the metering software on the portable unit 1204.

Figure 17:
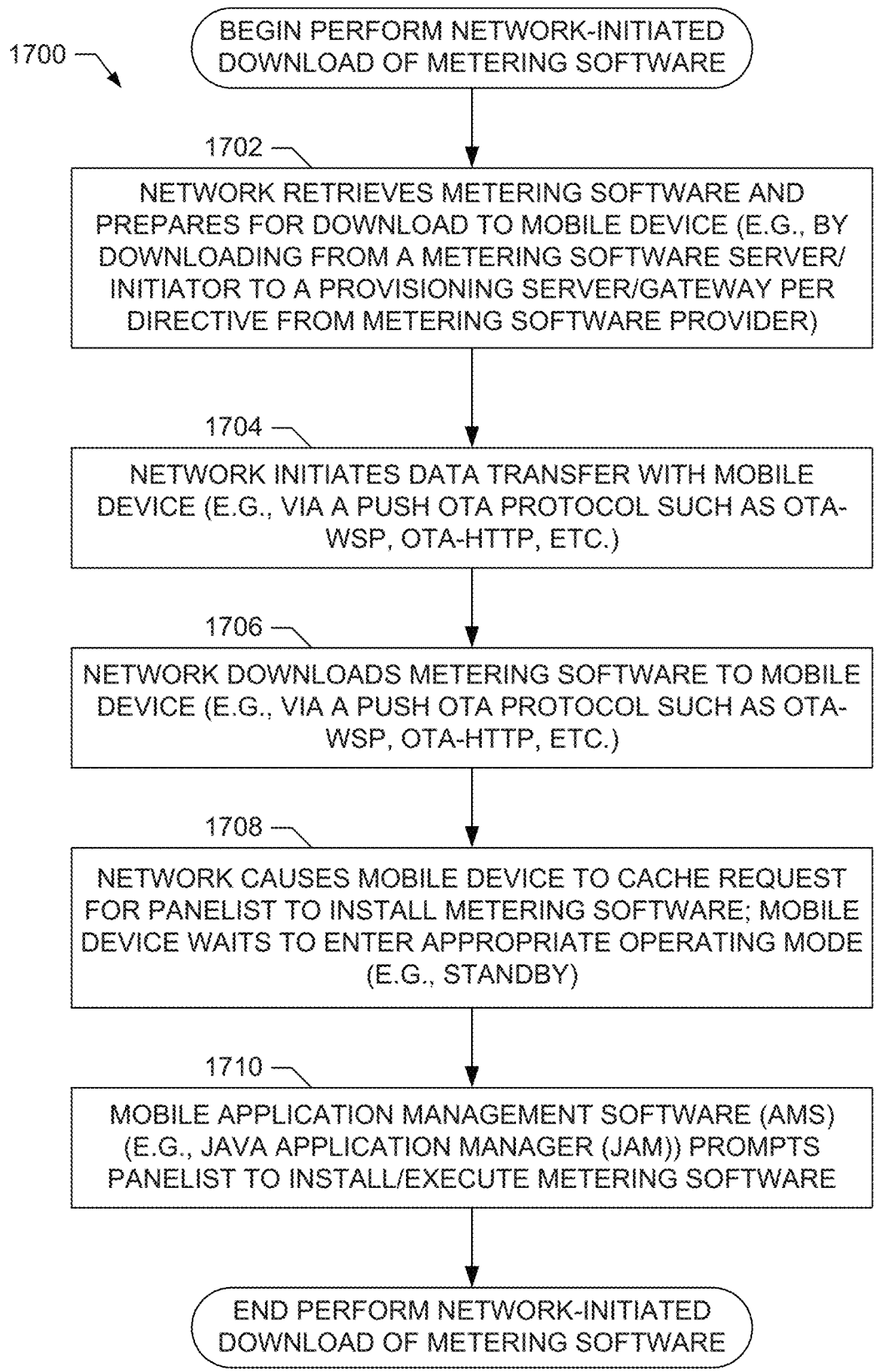
Figure 18:
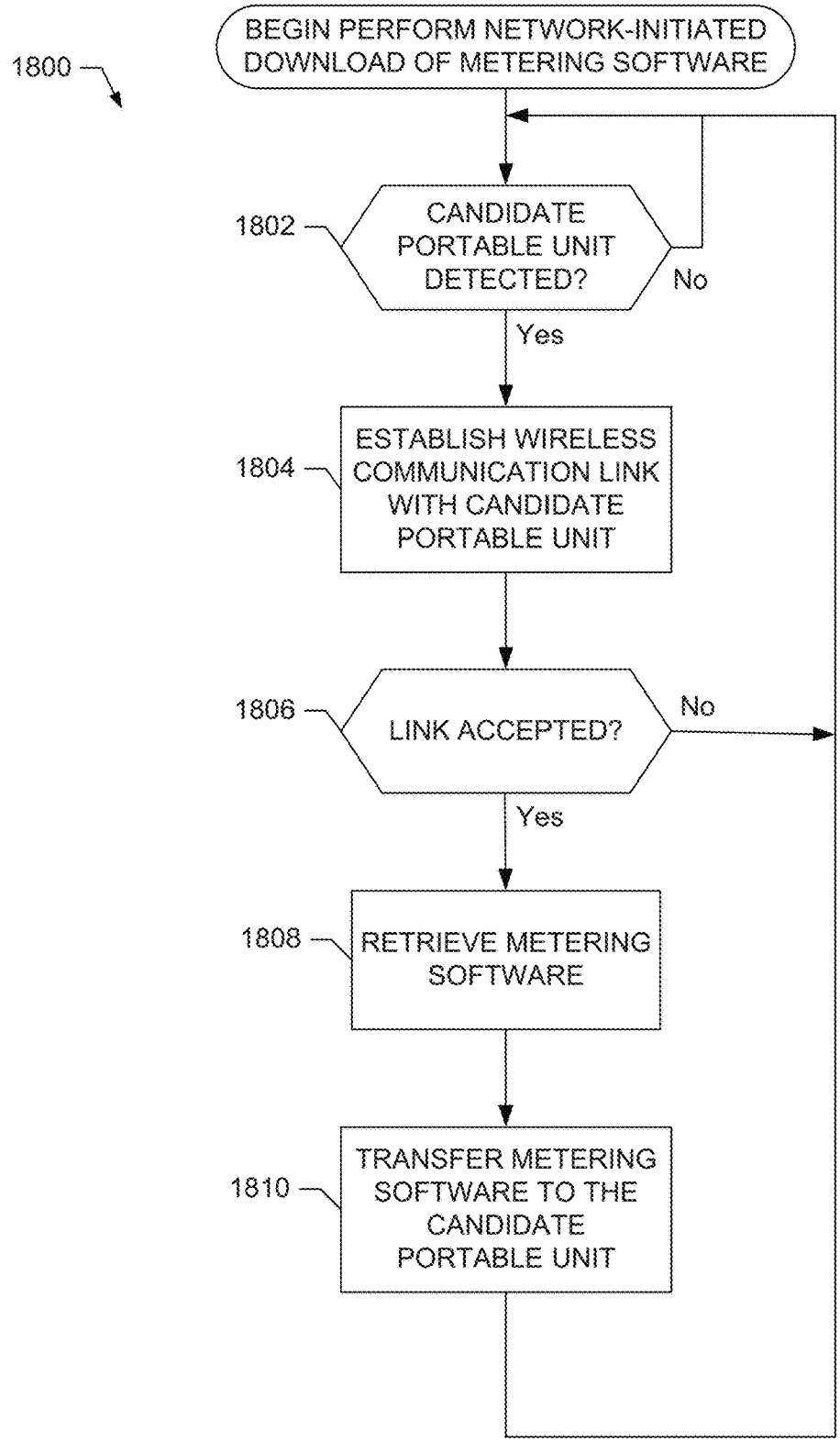
Figure 19:
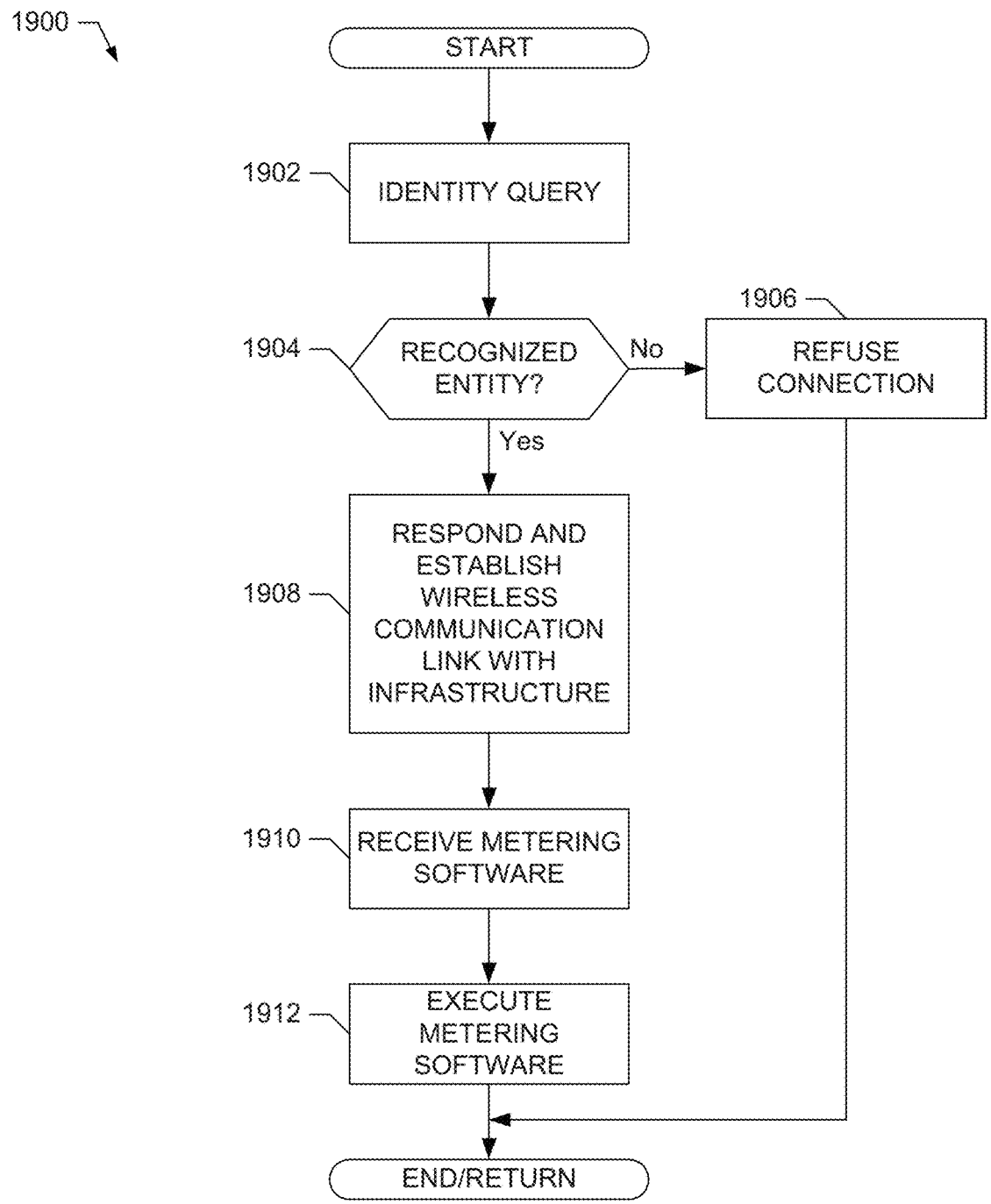
Figure 20:
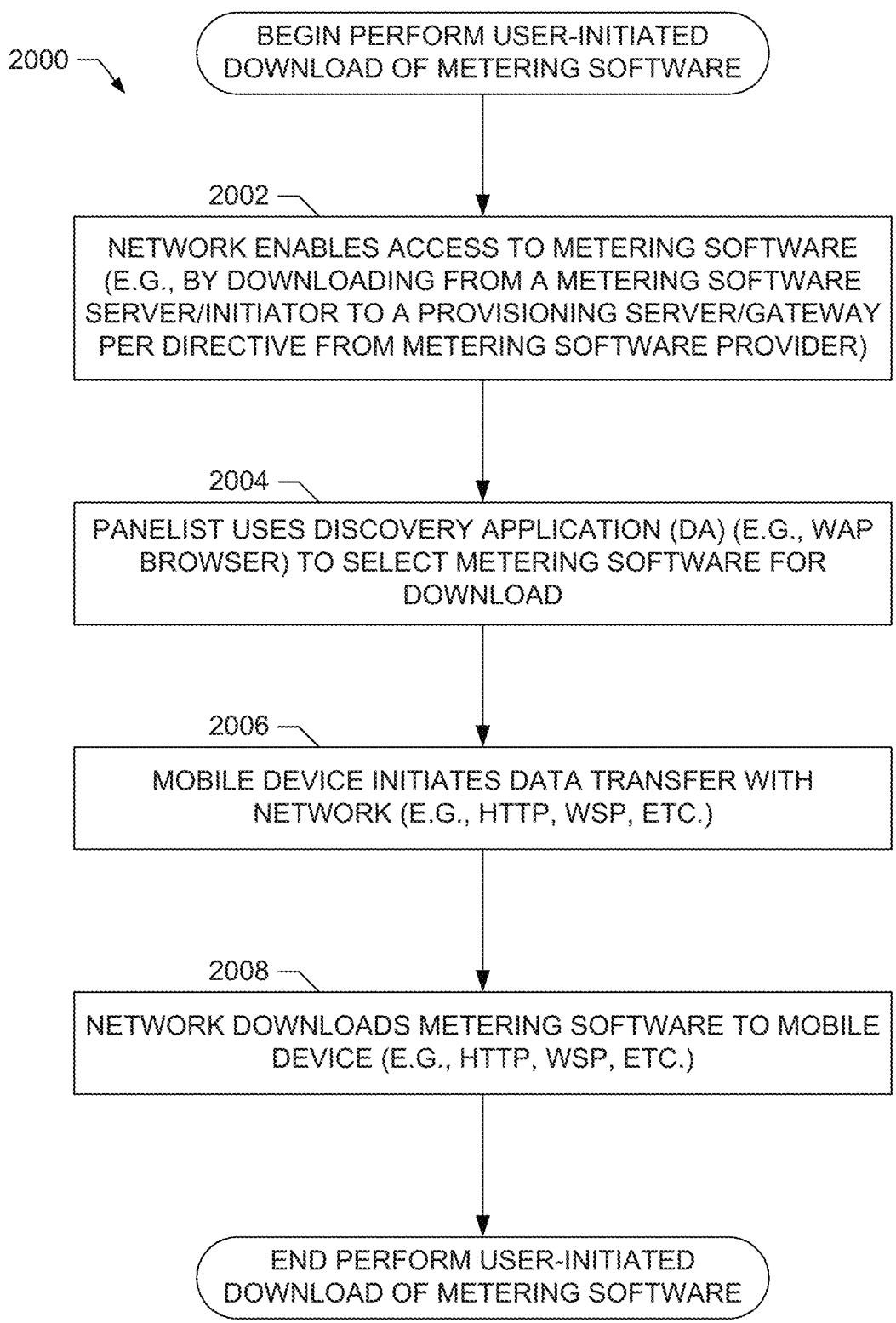

If network-initiated software download is available (block 1408), the process 1400 performs a network-initiated software download of the appropriate metering software to the portable unit 1204 used by the panelist (block 1410). If, however, network-initiated software download is not available (block 1408), the process 1400 performs a user-initiated software download of the metering software to the portable unit 1204 (block 1412). Example processes to implement the functionality of block 1410 are shown in FIGS. 17-19. Additionally, an example process to implement the functionality of 1412 is shown in FIG. 20.

Figure 21:
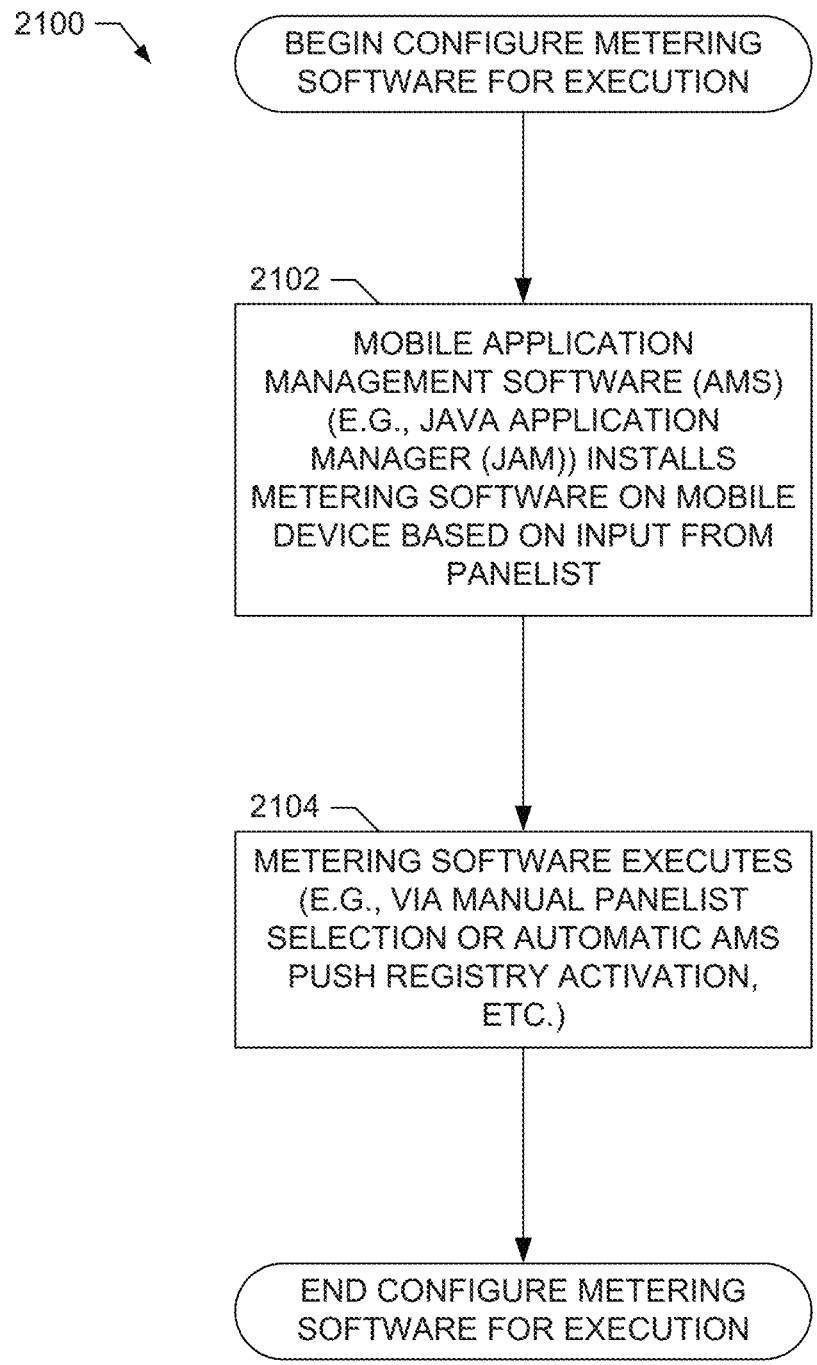

After processing at either block 1410 or block 1412 completes and the metering software is downloaded to the portable unit 1204, the process 1400 then configures the metering software for execution on the portable unit 1204 (block 1414). An example process to implement the functionality of block 1414 is shown in FIG. 21 and discussed in greater detail below. The example process 1400 then ends. After installation, the metering software may prompt the panelist to enter demographic information. Additionally, once operational, the metering software enables the portable unit 1204 to perform metering functions in addition to the conventional functions associated with the portable unit 1204. As noted previously, the metering software may run for a limited period of time and then automatically uninstall itself, once the cooperation of this specific panelist is no longer required. Alternatively, uninstallation may need to be done manually by the panelist when cooperation is no longer required or when they wish to no longer be a panelist.

Figure 15:
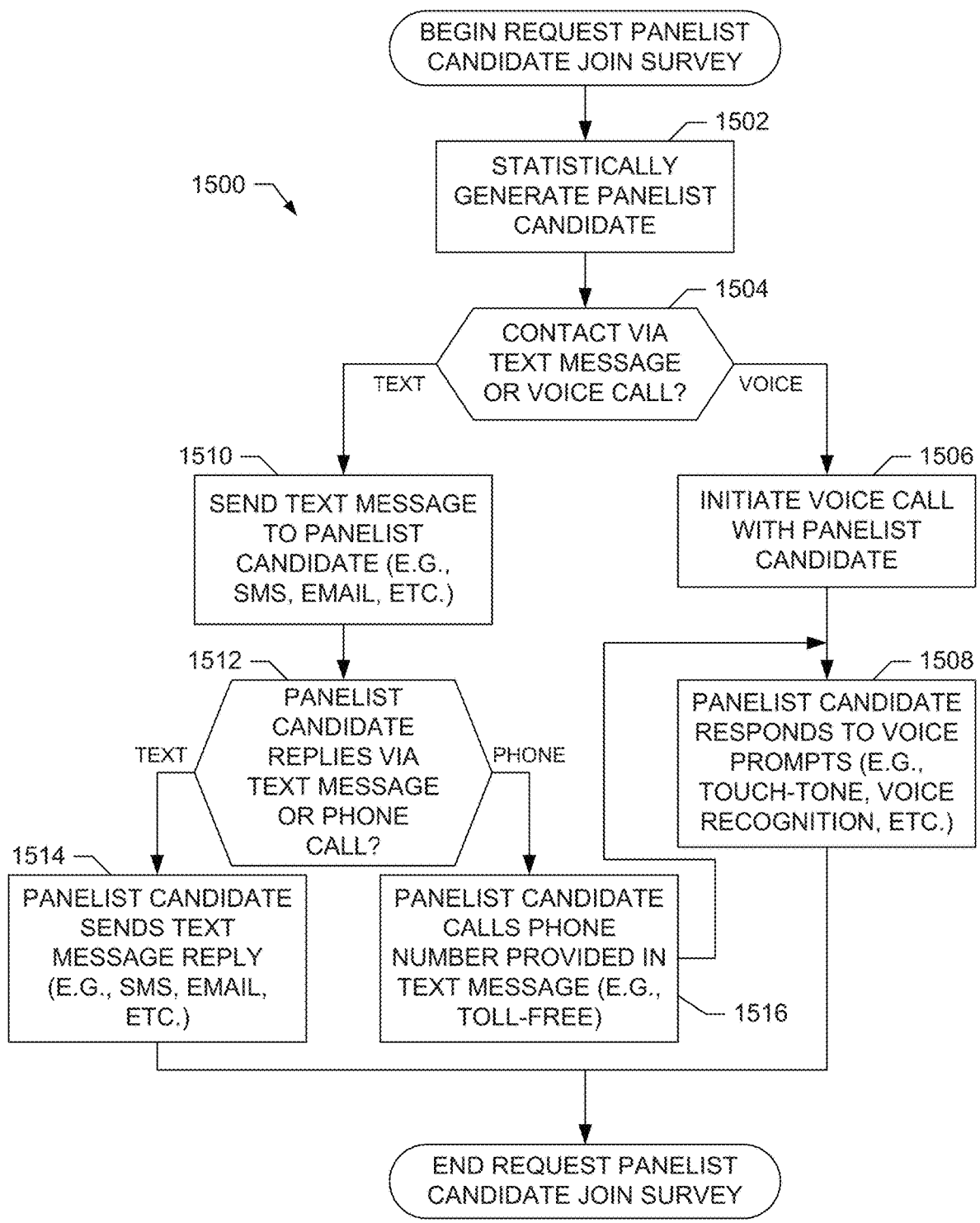

An example process 1500 to contact a panelist candidate and request that the candidate participate in an audience measurement study is shown in FIG. 15. The example process 1500 may be used to implement the functionality of block 1402 of FIG. 14. The example process 1500 begins by statistically generating a panelist candidate to be contacted for possible inclusion in an audience measurement study (block 1502). For example, according to the type of portable unit 1204, the process 1500 may generate a random phone number based on one or more area codes assigned to a particular cellular telephony service provider, a random Internet Protocol (IP) address based on a network address or range of addresses assigned to a particular Wireless Fidelity (Wi-Fi) service provider, etc. The process 1500 then determines whether a text message or a voice call should be used to contact the panelist candidate via the portable unit 1204 (block 1504). For example, such a determination may be made based on the capabilities of the portable unit 1204, the expected level of technical sophistication of the panelist candidate, the level of automation available to the process 1500 for communicating with panelist candidates, etc.

If the process 1500 determines that a voice call should be used (block 1504), then a voice call is placed via the network provider 1207 to the portable unit 1204 corresponding to the panelist candidate determined at block 1502 (block 1506). The voice call may include an automated message requesting that the recipient become a panelist in the audience measurement study. The message may then prompt the recipient to indicate acceptance or rejection of the request and process the recipient's response (block 1508). For example, the recipient may be prompted to respond via a touch-tone response by pressing a particular value of a numeric keypad included in the portable unit 1204. Additionally or alternatively, the recipient may be prompted to respond via voice recognition by speaking a particular word or phrase. In either case, after the recipient's response is processed (block 1508), the example process 1500 ends.

If, however, the process 1500 determines that a text message should be used (block 1504), then a text message, such as an "instant message," is sent via the network provider 1207 to the portable unit 1204 corresponding to the panelist candidate determined at block 1502 (block 1510). For example, the text message may be sent via short message service (SMS), email, etc. The text message may request that the recipient become a panelist in the audience measurement study. The message may then prompt the recipient to accept the request by, for example, replying directly to the text message, calling a toll-free phone number included in the text message, etc. If the recipient responds via a text message (e.g., a direct reply to the text message sent at block 1510) (block 1512), then the portable unit 1204 may send the text message via SMS, email, etc. (block 1514). The example process 1500 then ends. If, however, the recipient responds via a phone call (block 1512), then the recipient may use the portable unit 1204 to place a phone call to the number provided in the text message sent at block 1510 (block 1516). The phone call may be answered by an automated answering system again requesting that the respondent participate in the audience measurement study. The answering system may then prompt the user to accept or reject the request and process the respondent's response (block 1508) as discussed above. The example process 1500 then ends.

An example process 1600 to add a panelist to an audience measurement study and authorize the download of appropriate metering software to a portable unit (e.g., the portable unit 1204) corresponding to the new panelist is shown in FIG. 16. The example process 1600 may be used to implement the functionality of block 1406 of FIG. 14. The example process 1600 begins by adding the panelist to the sample set corresponding to the audience measurement study (block 1602). For example, the process 1600 may add the name of the candidate and other identifying information to an audience measurement study database. Additionally or alternatively, the process 1600 may add descriptive information regarding the portable unit 1204 (e.g., phone number, IP address, device type, device capabilities, etc.) used by the panelist to the audience measurement study database. The example process 1600 then authorizes the download of the appropriate metering software to the portable unit 1204 corresponding to the new panelist (block 1604). For example, this authorization may be performed by sending an authorization message from the metering provider 1202 to the network provider 1207. The example process 1600 then ends.

An example process 1700 to perform a network-initiated download of metering software to a portable unit (e.g., the portable unit 1204) is shown in FIG. 17. The example process 1700 may be used to implement the functionality of block 1410 of FIG. 14. The example process 1700 begins by directing the network provider 1207 to retrieve the metering software from the meter provider 1202 (e.g., by downloading the software from a server, web-site, etc.) and prepare the metering software for download to the portable unit 1204 (e.g., by placing the software on a network provisioning server, gateway, etc.) (block 1702). The process 1700 then causes the network provider 1207 to initiate a data transfer with the portable unit 1204 (e.g., via a push over-the-air (OTA) protocol such as OTA-WSP (Wireless Session Protocol), OTA-HTTP (Hyper Text Transfer Protocol), etc.) (block 1704). The process 1700 then causes the network provider 1207 to download the metering software to the portable unit 1204 (block 1706). After the download completes (block 1706), the process 1350 directs the network provider 1207 to store (cache) a request for the panelist to install the metering software (block 1708). The request is stored (cached) until the portable unit 1204 enters an appropriate operating mode during which the software may be installed (such as a standby mode during which the portable unit 1204 is not performing any other function, etc.). After the portable unit 1204 enters such a mode (block 1708), the process 1700 may then cause application management software (AMS) executing on the portable unit 1204 to prompt the panelist to install and/or execute the downloaded metering software (block 1710). For example, a JAVA Application Manager (JAM) is an AMS that may be used if the metering software is a JAVA application. The example process 1700 then ends.

While the foregoing description included various techniques for transferring metering software to a portable unit, one particular example is now described in conjunction with FIGS. 18 and 19. The example of FIGS. 18 and 19 uses wireless communication capabilities provided by an extensible data transport protocol, such as the Extensible Markup Language (XML). Further detail regarding extensible data transport protocol communications may be found in International Application PCT/US2004/000818, filed Jan. 14, 2004, and entitled "Portable Measurement Architecture and Methods for Portable Audience Measurement," the benefit of which is claimed and the contents of which is expressly incorporated herein by reference.

Configurations such as those described in conjunction with FIGS. 18 and 19 may operate based on the ability of infrastructure (e.g., base stations) and portable units (e.g., the portable unit 1204) to detect each others presence when they are proximate one another. After detection, the infrastructure and the portable units attempt to negotiate communications. Of course, if a party is unrecognized (e.g., the portable unit does not recognize the infrastructure), the communication may be refused (e.g., the portable unit may refuse to negotiate communications with the infrastructure). As will be readily appreciated, such systems may operate using any number of different protocols, such as Bluetooth, 802.11x, General Packet Radio Service (GPRS), code-division multiple-access (CDMA), infrared (IR), or the like.

Such systems are advantageous for the distribution of metering functionality to portable units, because as infrastructure for such systems become ubiquitous, it will be quite easy to distribute the metering software to a portable unit wherever that portable unit is located. Furthermore, as described in the above-identified International Application, such communications systems and protocols provide convenient means by which metering information (e.g., codes and signatures associated with media) acquired by a portable unit may be distributed back to a facility that processes such information.

Turning now to FIG. 18, an example network-initiated download process 1800, which may be performed by one or more infrastructure stations, is shown. Of course, the operations of one or more infrastructure stations may be coordinated so that the network acts as one unit having multiple access points defined by the infrastructure locations. The process 1800 is one manner in which the block 1410 of FIG. 14 may be implemented. The process 1800 begins by searching for candidate portable units (block 1802). A candidate unit may be any portable unit identified for reception of metering software. For example, any portable unit identified at block 1406 of FIG. 14 may be referred to as a candidate portable unit. The search may be a coordinated search in which the network is aware of each candidate portable unit and uses multiple infrastructure locations of the network to scan for candidate portable units.

If no candidate portable unit is detected (block 1802), the process 1800 continues to scan for candidates. When a candidate portable unit is found (block 1802), the network attempts to establish a wireless communication link with the candidate portable unit (block 1804). For example, the infrastructure location or node that identified the presence of the candidate portable unit may attempt to establish wireless communications with the candidate unit. Of course, as noted above and as described in conjunction with FIG. 19 below, the candidate portable unit may refuse the link from the network (block 1806), in which case the process 1800 returns to scanning.

If the link is accepted (block 1806), the process 1800 retrieves the metering software, which may be stored local to the network or may be stored at another location, such as that of the meter provider (e.g., the meter provider 1202 of FIG. 12) (block 1808). For example, the metering software may be stored in a non-volatile memory, such as a hard drive, an optical drive, or the like, so that the metering software is readily available and latency is minimized. After the metering software is retrieved (block 1808), the metering software is transferred to the candidate portable unit (block 1810) so that the candidate portable unit may install and execute the metering software.

FIG. 19 shows a process 1900, which is a counterpart to the process 1800, that may be executed by a candidate portable unit (e.g., the portable unit 1204 of FIG. 12). The portable unit, which, as noted above, may be a PDA, a cellular telephone, a Bluetooth enabled device, or the like, receives an identity query from a network (block 1902). One source of the identity query may be the network and the infrastructure searching for candidate portable units, such as those identified by block 1406 of FIG. 14.

In response to the identity query (block 1902), the process 1900 determines if the entity making the query is recognized (block 1904). For example, the process 1900 may refuse communication links from any entity to which prior approval has not been granted by a user. Prior approval may be received, for example, when a potential panelist was contacted and indicated willingness to participate in the survey (blocks 1402 and 1404 of FIG. 14). At such a point in time, the candidate portable unit may have stored an identifier of the entity that would later contact the candidate portable unit to provide metering software. Alternatively, the panelist may be prompted via, for example, text messaging, to acknowledge and accept the metering software. If the entity is not recognized (block 1904), the connection is refused (block 1906) and the process 1900 ends.

Alternatively, if the entity is recognized and download of the metering software is deemed acceptable (block 1904), the process 1900 responds to the query and establishes a wireless communication link with the infrastructure (block 1908). Subsequently, the metering software is received (block 1910) and executed (block 1912) before the process 1900 ends.

An example process 2000 to perform a user-initiated download of metering software to a portable unit (e.g., the portable unit 1204) is shown in FIG. 20. The example process 2000 may be used to implement the functionality of block 1412 of FIG. 14. The example process 2000 begins by having the network provider 1207 enable the portable unit 1204 to access the metering software (block 2002). For example, the process 2000 may direct the network provider 1207 to retrieve the metering software from the meter provider 1202 (e.g., by downloading the software from a server, web-site, etc.) and prepare the metering software for download to the portable unit 1204 (e.g., by placing the software on a network provisioning server, gateway, etc.). The process 2000 then instructs the panelist to use a Discovery Application (DA) executing on the portable unit 1204 (such as a Wireless Application Protocol (WAP) browser) to select the metering software for download (block 2004). The process 2000 then causes the portable unit 1204 to initiate a data transfer with the network provider 1207 (e.g., via HTTP, WSP, etc.) (block 2006). The process 2000 then causes the network provider 1207 to download the metering software to the portable unit 1204 (block 2008). The example process 2000 then ends.

An example process 2100 to configure metering software for execution on a portable unit (e.g., the portable unit 1204) is shown in FIG. 21. The example process 2100 may be used to implement the functionality of block 1414 of FIG. 14. The example process 2100 begins by directing the AMS executing on the portable unit 1204 to install the metering software (block 2102). The metering software is then initialized and executed by the portable unit 1204 (block 2104), for example, in response to a command by the panelist operating the portable unit 1204, as a result of automatic activation through use of a push registry in the AMS, etc. The example process 2100 then ends.

Figure 22:
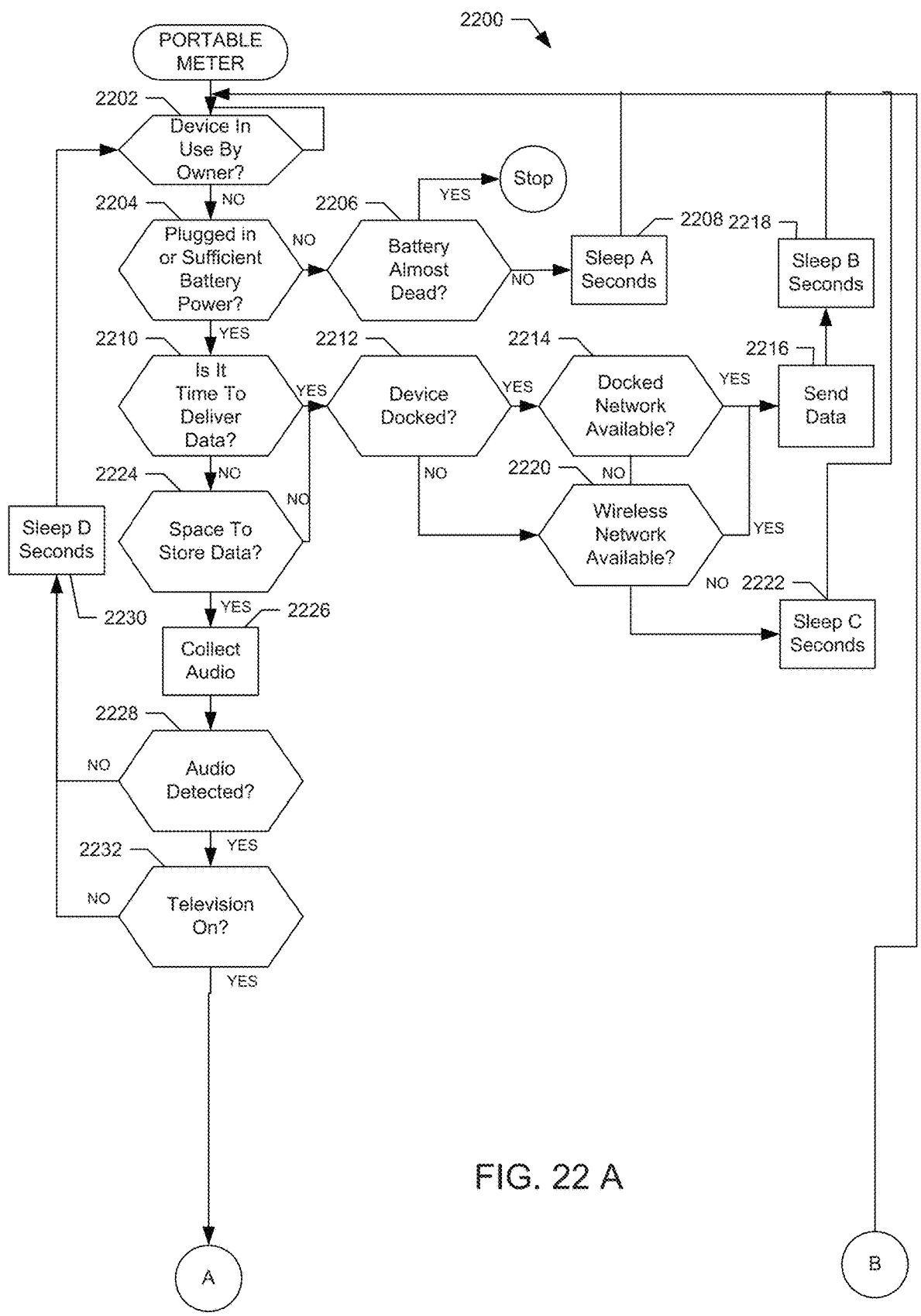
FIGS. 22A and 22B form a flow diagram of a portable meter process.

A portable meter process 2200 as shown in FIGS. 22A and 22B, collectively FIG. 22, represents instructions that may be implemented by the portable unit 1204 once the metering software in downloaded thereto. The process 2200 may be executed periodically or may be driven by the occurrence of one or more particular events. The process 2200 begins by determining if the portable unit 1204 is being used for its native purpose (block 2202). For example, if the portable unit 1204 is a cellular telephone, the process 2200 will determine if the panelist is in a telephone call or is performing some other function native to the cellular telephone. The execution of the process 2200 halts until the portable unit 1204 is not in use. One possible event that could drive activation of the meter software is location determination. For example, if the meter is near to a known media source (TV in the home), it may automatically activate. This is only useful for in-home rather than out-of-home measurement of exposure to media content.

When the portable unit 1204 is not in use (block 2202), the process 2200 determines if the portable unit is plugged into a power supply or has sufficient/acceptable battery power (block 2204). If the portable unit 1204 is not sufficiently powered (block 2204), it is determined if the battery of the portable unit 1204 is almost dead (block 2206). If the battery is almost dead (block 2206), the process stops execution. Alternatively, if the battery is almost dead (block 2206), the process may sleep for period H and try again later. Conversely, if the battery of the portable unit 1204 is not almost dead, the portable unit 1204 sleeps for A seconds (block 2208). The magnitude of A seconds is addressed below in reference to other time events. Overall, the objective is not to drain the battery too far on the device so the panelist can continue to use the device for its originally intended purpose.

If it is determined that the portable unit 1204 has sufficient power (block 2204), it is determined if it is time to deliver data (block 2210). Data delivery time may be determined by the lapsing of a period of time or by a data buffer or memory filling with data to be delivered. If it is time to deliver data (block 2210), it is determined if the portable unit 1204 is docked (block 2212). For example, the portable unit 1204 may be docked in a cradle that is coupled to the download station 1208. If the portable unit 1204 is docked (block 2212), it is determined if the docked network is available (block 2214). For example, the docked network may be a network connection between the download station 1208 and the meter provider 1202, if the meter provider 1202 is to receive the data stored within the portable unit 1204. Alternatively, the docked network could be a connection to another entity that is to receive the stored information.

If the docked network is available (block 2214), the stored data is sent (block 2216) and the portable meter sleeps for B seconds (block 2218). Alternatively, if the device is not docked (block 2212) or the docked network is not available (block 2214), it is determined if a wireless network is available (block 2220). If the wireless network is available (block 2220), the data is sent (block 2216) and the portable unit 1204 sleeps for B seconds (block 2218). Alternatively, the portable unit 1204 sleeps for C seconds (block 2222).

If it is not time to deliver data (block 2210), it is determined if the portable unit 1204 has space to store additional data (block 2224). If there is no available space (block 2224), it is determined if the device is docked (block 2212) and the process 2200 proceeds from there as described. Alternatively, if there is space to store data (block 2224), audio is collected (block 2226). Although audio is specifically mentioned, video or other data could be collected at block 2226. It is then determined if audio is present (block 2228) by determining if audio is detected. If audio is not detected (block 2228), the portable unit 1204 sleeps for D seconds (block 2230). If audio is detected (block 2230), it is determined if the television is on (block 2232). If it is determined that the television is not on (block 2232), the portable unit 1204 sleeps for D seconds (block 2230).

Alternatively, if it is determined that the television is on (block 2232), it is determined if a code has been detected within the last F seconds or not within G seconds (block 2234). If the test in block 2234 is not satisfied, signatures of the audio, video, or date being received are generated (block 2236). Alternatively, if the test of block 2234 does not fail, it is determined if an audio code is detected (block 2238). If an audio code is not detected (block 2238), signatures are generated (block 2236). Alternatively, if an audio code is detected (block 2238), it is determined if the portable unit 1204 is plugged in or has high battery power (block 2240). If power is sufficient (block 2240), signatures are generated (block 2236). Alternatively, there may be an option mode in which signatures are generated even when codes are detected.

After signatures have been generated (block 2236) or if it is determined that the portable unit is not plugged in or has sufficiently high battery power (block 2240), the portable unit 1204 determines if position information is available (block 2242). The position information may be provided, for example, by land or satellite-based global positioning system transmitters. If position information is not available (block 2242), it is determined if emergency/911 location information is available (block 2244). If either position information or emergency/911 position information is available, the location of the portable unit 1204 is determined 2246.

After either the location is determined (block 2246) or if the emergency/911 location is not available (block 2244), television on/off codes, audio codes, signatures, and locations are stored (block 2248). After storage of the specified information (block 2248), the portable unit 1204 sleeps for E seconds (block 2250).

As noted above, various sleep times are specified in the process 2200. In general, the X may be referred to as the desired metering accuracy, which may be, for example, 60 seconds. If such an assumption is made, the values of A-F are defined as follows:

$A=(X*5)$ seconds+configurable constant1

$B=0$ seconds+configurable constant2

$C=X$ seconds+$f$(Remaining Battery Life)+configurable constant3

$D=X$ seconds+$f$(Remaining Battery Life)+configurable constant4

$E=X$ seconds+$f$(Remaining Battery Life)+configurable constant5

$F=X$ seconds+configurable constant6

$G=(X*5)$ seconds+configurable constant7, wherein $f$(Remaining Battery Life) represents a variable that is a function of battery life.

$H=X$ seconds+$f$(Remaining Battery Life)+configurable constant8

The methods and apparatus disclosed herein are particularly well suited for use with a television. However, the teachings of the disclosure may be applied to other electronic devices media presentation devices, such as a personal computer, a radio, or any other device capable of presenting media programming, without departing from the scope or spirit thereof. In addition, although the audience measurement system described herein is disclosed as being used to meter viewing of a television relative to a viewing area located within a household, the system may be used to meter viewing that occurs at any location. Thus, the household members described with respect to the household may instead be office workers and the system may be used to meter their viewing habits relative to an office.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A system comprising:
 means for sending a message to a mobile device;
 means for downloading a metering software module to the mobile device, the means for downloading to:
  collect demographic data of a user, including a phone number for the mobile device, via a website associated with an information gathering entity, the demographic data collected via the website from a personal computer, separate from the mobile device, used to access the website; and
  download the metering software module to the mobile device dependent upon receipt of a response to the sent message;
 means for processing information indicative of events associated with use of the mobile device, the means for processing to:
  receive, from the mobile device, the information indicative of the events associated with the use of the mobile device; and
  associate the received information with the demographic data.

2. The system of claim 1, wherein the means for processing operates dependent upon one or more predetermined criteria being met, the one or more predetermined criteria including at least one of:
 a lapsing of a period of time;
 a filling of a data buffer;
 a wireless network connection with the mobile device being available; or
 a docked network connection with the mobile device being available.

3. The system of claim 1, wherein the means for downloading is to gain permission from the user of the mobile device to download the metering software module to the mobile device.

4. The system of claim 1, wherein the events associated with the use of the mobile device correspond to viewing events associated with television programming monitored using the metering software module.

5. The system of claim 4, wherein the television programming is received by the mobile device.

6. A system comprising:
 means for sending a message to a mobile device addressed to a user;
 means for downloading a metering software module to the mobile device, the means for downloading to:
  collect demographic data, including a phone number for the mobile device, via a website associated with an information gathering entity, the demographic data collected via the website from a personal computer, separate from the mobile device, used to access the website; and
  download the metering software module to the mobile device dependent upon receipt of a response to the sent message, the metering software module to acquire and store events the mobile device is engaged in performing; and
 means for receiving reported data from the mobile device at a server associated with the information gathering entity.

7. The system of claim 6, wherein the means for receiving is to collect events associated with use of the mobile device.

8. The system of claim 7, wherein the means for receiving is to collect the events associated with the use of the mobile device dependent upon a predetermined criterion being met.

9. The system of claim 7, wherein the events correspond to viewing events associated with television programming monitored using the metering software module.

10. The system of claim 6, wherein the means for downloading is to gain permission from the user of the mobile device to download the metering software module to the mobile device.

11. At least one storage device comprising computer readable instructions that, when executed, cause at least one processor to at least:

collect demographic data, including a phone number for a mobile device, via a website associated with an information gathering entity, the demographic data collected via the web site from a personal computer, separate from the mobile device, used to access the website;

send a message to the mobile device;

download a metering software module to the mobile device dependent upon receipt of a response to the sent message; and receive, from the mobile device, event data associated with the use of the mobile device.

12. The at least one storage device of claim 11, wherein the instructions cause the at least one processor to associate the event data with the demographic data.

13. The at least one storage device of claim 11, wherein the demographic data is of a user, and the message is addressed to the user.

14. The at least one storage device of claim 11, wherein the metering software module is to acquire and store events the mobile device is engaged in performing.

15. The at least one storage device of claim 11, wherein the instructions cause the at least one processor to collect the event data dependent upon a predetermined criterion being met.

16. The at least one storage device of claim 15, wherein the predetermined criterion includes at least one of:
   a lapsing of a period of time;
   a filling of a data buffer;
   a wireless network connection with the mobile device being available; or
   a docked network connection with the mobile device being available.

17. The at least one storage device of claim 11, wherein the instructions cause the at least one processor to gain permission from a user of the mobile device to download the metering software module to the mobile device.

18. The at least one storage device of claim 11, wherein the event data corresponds to viewing events associated with television programming monitored using the metering software module.

19. The at least one storage device of claim 18, wherein the television programming is received by the mobile device.

* * * * *